(12) United States Patent
Meyer et al.

(10) Patent No.: US 12,104,045 B2
(45) Date of Patent: Oct. 1, 2024

(54) OPAQUE MULTI-LAYER BODY MADE OF POLYCARBONATE AND HAVING WEATHERING STABILITY

(71) Applicant: COVESTRO INTELLECTUAL PROPERTY GMBH & CO. KG, Leverkusen (DE)

(72) Inventors: Alexander Meyer, Düsseldorf (DE); Joerg Reichenauer, Krefeld (DE); Ulrich Blaschke, Krefeld (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 976 days.

(21) Appl. No.: 15/733,860

(22) PCT Filed: May 27, 2019

(86) PCT No.: PCT/EP2019/063606
§ 371 (c)(1),
(2) Date: Nov. 30, 2020

(87) PCT Pub. No.: WO2019/228959
PCT Pub. Date: Dec. 5, 2019

(65) Prior Publication Data
US 2021/0221977 A1    Jul. 22, 2021

(30) Foreign Application Priority Data
May 29, 2018    (EP) .................... 18174694

(51) Int. Cl.
| | |
|---|---|
| *C08K 9/02* | (2006.01) |
| *C08J 7/043* | (2020.01) |
| *C08J 7/046* | (2020.01) |
| *C08K 3/22* | (2006.01) |
| *C08K 3/36* | (2006.01) |
| *C08K 5/18* | (2006.01) |
| *C08K 5/3475* | (2006.01) |
| *C09D 7/62* | (2018.01) |
| *C09D 7/63* | (2018.01) |

(52) U.S. Cl.
CPC ............... *C08K 9/02* (2013.01); *C08J 7/043* (2020.01); *C08J 7/046* (2020.01); *C08K 3/22* (2013.01); *C08K 5/18* (2013.01); *C08K 5/3475* (2013.01); *C09D 7/62* (2018.01); *C09D 7/63* (2018.01); *C08K 2003/2227* (2013.01); *C08K 2003/2241* (2013.01); *C08K 3/36* (2013.01)

(58) Field of Classification Search
CPC ............ Y10T 428/25; Y10T 428/256; Y10T 428/257; Y10T 428/259; Y10T 428/29; Y10T 428/2982; Y10T 428/2991; Y10T 428/2993; Y10T 428/31507; Y10T 428/31928; Y10T 428/31935; B32B 27/00; B32B 27/06; B32B 27/18; B32B 27/20; B32B 27/30; B32B 27/308; B32B 27/36; B32B 27/365; B32B 33/00; B32B 2264/10; B32B 2264/102; B32B 2264/1021; B32B 2264/1022; B32B 2264/1023; B32B 2264/30; B32B 2264/302; B32B 2264/303; B32B 2264/40; B32B 2264/403; C09C 1/36; C09C 1/3607; C09C 1/3653; C09C 1/3661; C09C 1/3692; C09C 3/006; C09C 3/06; C09C 3/063; C08K 3/013; C08K 3/22; C08K 2003/2227; C08K 2003/2241; C08K 3/34; C08K 3/36; C08K 9/00; C08K 9/02; C08K 2201/003; C08K 2201/005; C08K 2003/2237
USPC ....... 428/323, 328, 329, 331, 357, 402, 403, 428/404, 412, 520, 522
See application file for complete search history.

(56) References Cited

U.S. PATENT DOCUMENTS

| | | | |
|---|---|---|---|
| 4,101,513 | A | 7/1978 | Fox et al. |
| 4,185,009 | A | 1/1980 | Frietag et al. |
| 4,395,463 | A | 7/1983 | Kray |
| 5,041,313 | A | 8/1991 | Patel |

(Continued)

FOREIGN PATENT DOCUMENTS

| | | |
|---|---|---|
| DE | 1031512 B | 6/1958 |
| DE | 2500092 A1 | 7/1976 |

(Continued)

OTHER PUBLICATIONS

International Preliminary Report on Patentability received for PCT Patent Application No. PCT/EP2019/063606, mailed on Dec. 10, 2020, 14 pages. (7 pages of English Translation and 7 pages of Original Document).

(Continued)

*Primary Examiner* — Maria V Ewald
*Assistant Examiner* — Ethan A. Utt
(74) *Attorney, Agent, or Firm* — The Webb Law Firm

(57) ABSTRACT

The invention relates to opaque colored multilayer articles having a substrate layer based on polycarbonate or polymethylmethacrylate. The compositions of the substrate layer contain a titanium dioxide having particular properties as white pigment. Compared to the Kronos® 2230 white pigment which is conventionally used as white pigment for corresponding compositions and has more particularly been specially matched to polycarbonate, it is possible to achieve considerably higher weathering stability of the colored shaped bodies provided that a UV absorber-containing coating has been applied to the substrate layer. Color stability and gloss are maintained even after weathering, and brilliant colors can thus be assured.

15 Claims, No Drawings

(56) References Cited

U.S. PATENT DOCUMENTS

| | | |
|---|---|---|
| 5,367,044 A | 11/1994 | Rosenquist |
| 5,391,795 A | 2/1995 | Pickett |
| 5,869,185 A | 2/1999 | Bahr et al. |
| 6,228,973 B1 | 5/2001 | McCloskey et al. |
| 6,350,512 B1 | 2/2002 | Hurley et al. |
| 2002/0028862 A1 | 3/2002 | Johnson et al. |
| 2005/0171227 A1 | 8/2005 | Weine Ramsey |
| 2006/0172136 A1 | 8/2006 | Komori et al. |
| 2007/0175363 A1* | 8/2007 | Blumel .................. C09C 1/3661 428/404 |
| 2008/0014376 A1 | 1/2008 | Horio et al. |
| 2011/0207846 A1 | 8/2011 | Monden |
| 2013/0048925 A1* | 2/2013 | Edwards .................. C09D 7/41 252/587 |
| 2013/0265771 A1 | 10/2013 | Flores et al. |
| 2014/0226342 A1* | 8/2014 | Flores ...................... C08K 9/02 524/413 |
| 2014/0322509 A1* | 10/2014 | Meyer ...................... C08K 3/04 264/129 |
| 2014/0370213 A1 | 12/2014 | Van Der Mee et al. |
| 2016/0046838 A1 | 2/2016 | Meyer et al. |

FOREIGN PATENT DOCUMENTS

| | | |
|---|---|---|
| DE | 2804283 A1 | 8/1978 |
| DE | 3121385 A1 | 8/1982 |
| DE | 4240313 A1 | 6/1994 |
| DE | 19943642 A1 | 3/2001 |
| DE | 10311063 A1 | 9/2004 |
| DE | 102007011069 A1 | 9/2008 |
| DE | 102008058351 A1 | 6/2010 |
| EP | 0110221 A2 | 6/1984 |
| EP | 0110238 A2 | 6/1984 |
| EP | 0280476 A2 | 8/1988 |
| EP | 0500496 A1 | 8/1992 |
| EP | 0517044 A2 | 12/1992 |
| EP | 0570165 A2 | 11/1993 |
| EP | 0716919 A2 | 6/1996 |
| EP | 0839623 A1 | 5/1998 |
| EP | 0924248 A1 | 6/1999 |
| EP | 1308084 A1 | 5/2003 |
| EP | 1506249 A1 | 2/2005 |
| EP | 1582549 A1 | 10/2005 |
| EP | 2804763 A1 | 11/2014 |
| EP | 3006527 A1 | 4/2016 |
| GB | 1476108 A | 6/1977 |
| JP | 2006240294 A | 9/2006 |
| JP | 2016507402 A | 3/2016 |
| WO | 96/15102 A2 | 5/1996 |
| WO | 02/26862 A1 | 4/2002 |
| WO | 03/95521 A1 | 11/2003 |
| WO | 2005/113639 A1 | 12/2005 |
| WO | 2006/108520 A1 | 10/2006 |
| WO | 2008/037364 A1 | 4/2008 |
| WO | 2008/071363 A2 | 6/2008 |
| WO | 2008/109072 A1 | 9/2008 |
| WO | 2010/057628 A1 | 5/2010 |
| WO | 2011/141369 A1 | 11/2011 |
| WO | 2012/080395 A1 | 6/2012 |
| WO | 2013/079477 A1 | 6/2013 |
| WO | 2013/107777 A1 | 7/2013 |
| WO | 2018062299 A1 | 4/2018 |

OTHER PUBLICATIONS

International Search Report and Written Opinion received for PCT Patent Application No. PCT/EP2019/063606, mailed on Jul. 17, 2019, 16 pages. (7 pages of English Translation and 9 pages of Original Document).

* cited by examiner

OPAQUE MULTI-LAYER BODY MADE OF POLYCARBONATE AND HAVING WEATHERING STABILITY

CROSS-REFERENCE TO RELATED APPLICATIONS

This application is a national stage application (under 35 U.S.C. § 371) of PCT/EP2019/063606, filed May 27, 2019, which claims benefit of European Application No. 18174694.2, filed May 29, 2018, both of which are incorporated herein by reference in their entirety.

The present invention relates to an opaque multilayer article comprising a thermoplastic layer based on polymethylmethacrylate or aromatic polycarbonate, comprising titanium dioxide, optionally a primer layer and a topcoat layer. The multilayer article of the invention is notable for high color stability and weathering stability.

Outer parts that are exposed to sunlight and weathering conditions and are used in the motor vehicle sector, rail vehicle sector and aircraft sector or in the infrastructure sector must have a long lifetime during which they must not become brittle. Furthermore, there should be only slight change, if any, in color and gloss over the lifetime.

Owing to the long lifetime of motor vehicles, rail vehicles, aircraft, other flying devices and architecture applications, especially in the field of high-value outer parts, it is important for the desired high-quality color impression of the material to be maintained over the period of utilization without significant losses. This is also true of parts for the interior, for example the vehicle interior, that are exposed to UV, for example parts for the dashboard.

Thermoplastic polymers, for example polycarbonate, offer many advantages over conventional materials for use in the vehicle sector and for buildings etc. These include, for example, elevated fracture resistance and/or a weight saving, which in the case of outer automobile parts allow greater safety and lower fuel consumption. They also enable a high level of design freedom. Among the thermoplastics, for example, compositions based on aromatic polycarbonate and/or polymethylmethacrylate (PMMA) are of particularly good suitability for use as outer material. Owing to high toughness, aromatic polycarbonate in particular has a very good profile of properties for such end uses.

The coloring of plastics per se is known. It is known to the person skilled in the art that there are weathering-stable color compositions suitable for use in transparent thermoplastic matrices. Such colorant combinations are described, for example, in WO 2011/141369 A1. However, the colorant combinations described in these applications are unsuitable for opaque shaped articles, but are suitable only for transparent shaped articles or multilayer articles, i.e. shaped articles having light transmittance of >1%. Surprisingly, these colorant combinations are unsuitable for combinations with inorganic white pigments, especially titanium dioxide, and especially unsuitable for use with titanium dioxide grades that have optimized coating for use in polycarbonate, such as Kronos® 2230 from Kronos Worldwide, Inc. It has been shown that colorants/colorant combinations that have high color stability in transparent setups, in combination with titanium dioxide, surprisingly show a very significant color shift or significant bleaching effects, and loss of gloss.

It is known in principle to the person skilled in the art that titanium dioxide has high photoactivity and hence can itself contribute to the breakdown of colorants and also of the thermoplastic matrix, or is a major cause of breakdown. The role of titanium dioxide on outside weathering or on irradiation with UV light, especially with use of titanium dioxide-containing thermoplastic materials, has been described, for example, by Bolt et al. in Plastics Rubber and Composites, 2008, vol. 37. p. 397-402. When it interacts with light, especially in the presence of oxygen and moisture, titanium dioxide leads to severe breakdown of thermoplastic materials and organic colorants. Therefore, in the event of weathering, significant yellowing, bleaching and chalking effects of thermoplastic materials containing titanium dioxide are observed. In addition, titanium dioxide itself can attack the thermoplastic matrix even in the absence of light or UV irradiation. For instance, in the case of compounding of thermoplastic materials, especially in the case of polycarbonate, there can be a decrease in molecular weight and melt instability. Moreover, there can be streaking in further process steps, such as in injection molding.

For that reason, optimized titanium dioxide grades have been developed for thermoplastic matrices. These titanium dioxide grades have an optimized coating or shell or sequence of shells, which enable compatibility with the respective polymer matrix and also reduce photoactivity. Such optimized titanium dioxide grades are described, for example, in DE 102008058351 A1. Commercially available titanium dioxide grades optimized for polycarbonate are, for example, Kronos 2230 and Kronos 2233 (Kronos Worldwide Inc.). However, it has been found that these grades too, in combination with colorants, lead to significant color shifts after weathering, and there is a need for improvement here.

The use of titanium dioxide as white pigment in thermoplastic materials is necessary in order to assure the high color brilliance required for outside applications in opaque colors. Attempts to replace titanium dioxide with other white pigments such as barium sulfate, kaolin, zinc sulfide etc., showed that it is not possible in this way to improve color stability or achieve the necessary color brilliance. For all opaque colors—except in the field of black colors—the use of titanium dioxide is thus absolutely necessary.

The prior art has described many organic colorants as being particularly lightfast and hence also stable. Lightfastness (determined at a standard depth of shade of ⅓ with 1% by weight of $TiO_2$ (PS 2% by weight of $TiO_2$ in accordance with DIN EN ISO 4892-2:2013-06; transparent compositions with 0.05% by weight of dye; assessed by 8-level blue scale) of the so-called Macrolex® dyes (Lanxess datasheets; technical information, Lanxess Deutschland GmbH, Functional Chemicals, High Performance Additives, Colorants, 51369 Leverkusen, Germany), for example of the dyes Macrolex® Blue RR (Solvent Blue 97), Macrolex® Violet 3R (Solvent Violet 36) that are intended for use in polycarbonate, has been classified as 7-8 (8=maximum value). Nevertheless, it has been found in the course of the present experiments that colorants formally classified as lightfast in polycarbonate compositions with polycarbonate-optimized titanium dioxide grades such as Kronos® 2230 do not have the necessary stability on weathering.

The person skilled in the art is also aware that thermoplastic materials can be stabilized by the use of particular additives. For instance, weathering stability can be improved by use of UV absorbers. However, this can achieve only inadequate color stabilization. Furthermore, the prior art describes stabilizer combinations of UV absorbers and free-radical scavengers. These especially include combinations of UV absorbers and HALS (hindered amine light stabilizers). Combinations of this kind are employable for particular thermoplastic matrices such as polyolefins and are described, for example, by Rajan et al. in J. of Appl. Pol. Sci. 2012, Vol. 124, 4007-4015, Moura et al. in Dyes and Pigments 1997, Vol. 33, No. 3, 173-196 and in US 20020028862 A1. Polycarbonate and similar esters or ester carbonates etc., however, are incompatible with amine-based systems. Some documents, such as EP 0 924 248 A1, describe specific polycarbonate-compatible HALS systems. However, such HALS systems are no longer industrially available owing to environmental problems or REACH registration processes, or lead to a decrease in molecular weight over the long term. Such substances are therefore ruled out for use in polycarbonate.

The person skilled in the art is also aware that coating of polycarbonate can increase weathering stability. Coatings of this kind are described, for example, in U.S. Pat. No. 5,041,313 A, DE 3121385 A1, U.S. Pat. No. 5,391,795 A, WO 2008/109072 A1. However, it has been shown that such coatings can merely delay color shifts and chalking effects in the case of opaque colors. Even with such coatings, in the case of non-black opaque colors, there are significant changes within relatively short weathering times, such as loss of gloss, color shift or bleaching effects.

It has been shown that the combination of customarily used titanium dioxide grades with various colorants in a polycarbonate substrate layer with coating is barely distinguishable from uncoated polycarbonate with regard to color stability after weathering. There is severe chalking, bleaching and loss of gloss after relatively short weathering times.

There is thus no description in the prior art of weathering-stable thermoplastic compositions, especially based on polycarbonate or PMMA, or corresponding shaped articles that are opaque and colored—L≠0, a*≠0, b*≠0, i.e. not black—L=a*=b=0, not white—L=100, a*=b*=0, and not gray—everything with L>0 and <100, a*=b*=0, and have high weathering stability.

The problem addressed was thus that of developing a color-stable shaped article made of a thermoplastic material,
having light transmittance of <0.5%, preferably <0.1%, in the range from 380 to 780 nm, determined at a sheet thickness of 4 mm to DIN ISO 13468-2:2006 (D65, 10°),
containing titanium dioxide and having high color brilliance even after weathering,
and also otherwise having high weathering stability, especially with respect to sunlight, i.e. having high color stability, wherein the change in the color values a*, b*, L* after artificial weathering for 2500 h, preferably 2750 h, with xenon illumination at 0.75 W at 340 nm to ASTM G 155-13 should be preferably ΔL*<1.5, further preferably <1.0, and Δa*<1.5, further preferably <1.0, even further preferably <0.8, and Δb*<1.5, and there should be no visually apparent distinct bleaching or loss of color,
based on a thermoplastic composition based on polycarbonate or PMMA,
having a b* (absolute value) of >0.5, preferably >1, further preferably >15, and an a* (absolute value) of >0.5, preferably >1, further preferably >30,
and if at all possible also having high melt stability, meaning that ΔMVR after 30 min, determined to ISO 1133:2012-03 (at a testing temperature of 300° ° C., mass 1.2 kg), of <1.5, especially <1.2.

The composition must also be processible at the temperatures customary for thermoplastics, i.e. at temperatures above 270° C., for example at 350° C., without undergoing marked changes in color or other physical parameters in the course of processing.

It was completely surprising that particular titanium dioxide grades show significantly higher weathering stability with coated polycarbonate. What this means is more particularly a distinctly smaller color shift and a smaller loss of gloss.

Color brilliance is a subjective impression that the eye or human brain perceives from the color. This impression correlates with high color saturation and also the spectral composition of the color. It is also important that gloss is good. As well as hue and brightness, color brilliance is one of the properties of a color that is perceived as being significant by man.

The problem is thus surprisingly solved by a
multilayer article comprising
a) a substrate layer having light transmittance in the range from 380 to 780 nm of less than 0.5%, preferably of less than 0.10%, determined at a sheet thickness of 4 mm to DIN ISO 13468-2:2006 (D65, 10°),
consisting of a thermoplastic composition based on polymethylmethacrylate or aromatic polycarbonate, preferably based on aromatic polycarbonate, comprising
i) titanium dioxide white pigment,
wherein the titanium dioxide present in the composition of the base layer has a rutile content of at least 60% by weight and a median particle size D50, determined by means of scanning electron microscopy, of ≥0.3 μm, and
wherein the titanium dioxide has a coating containing silicon dioxide, aluminum oxide and optionally titanium dioxide, and wherein the ratio of the sum total of the aluminum content and silicon content in atom % in the coating to the titanium content in atom % in the coating is greater than 5:1,
ii) at least two colorants that are either one organic colorant and one inorganic colorant or two organic colorants, wherein the inorganic colorant is not a titanium dioxide and not a carbon black,
b) optionally a primer layer and
c) a topcoat layer,
wherein the primer layer and/or the topcoat layer includes at least one UV absorber.

The proportions of the elements in atom % in the coating have preferably been determined by means of x-ray photo electron spectroscopy. It will be apparent that, according to the thickness of the coating, the detection angle should be chosen appropriately such that the entire coating layer is covered. The preparation and sample handling are preferably in accordance with ISO 18117:2009-06 and ISO 18116: 2005-08.

The problem is also solved by the use of
the white pigment titanium dioxide having a rutile content of at least 60% by weight and a median particle size D50, determined by means of scanning electron microscopy, of ≥0.3 μm, and having a coating comprising silicon dioxide, aluminum oxide and optionally titanium dioxide, wherein the ratio of the sum total of the aluminum content and silicon content in atom % in the coating to the titanium content in atom % in the coating, preferably determined by means of x-ray photon electron spectroscopy, is greater than 5:1,
in a substrate layer in combination with a coating comprising a topcoat layer and optionally a primer layer, wherein the topcoat layer and/or the primer layer includes at least one UV absorber, for achievement of weathering stability, expressed by a change in the color values a*, b*, L* after artificial weathering for 2500 h, preferably 2750 h, even further preferably 3000 h, with xenon illumination at 0.75 W at 340 nm to ASTM G 155-13 of ΔL*<1.5, further preferably <1.0 and Δa*<1.5, further preferably <1.0, even further preferably <0.8, and Δb*<1.5, of colored multilayer articles comprising
a) the substrate layer having light transmittance in the range from 380 to 780 nm of less than 0.5%, determined at a sheet thickness of 4 mm to DIN ISO 13468-2:2006 (D65, 10°), consisting of a thermoplastic composition based on polymethylmethacrylate or aromatic polycarbonate and comprising
   at least two colorants that are either one organic colorant and one inorganic colorant or two organic colorants, wherein the inorganic colorant is not a titanium dioxide and not a carbon black,
b) the coating comprising the topcoat layer and optionally the primer layer.

What is meant by "multilayer article" in the context of the invention is "at least two layers", namely a substrate layer and a topcoat layer intended to lie on the side of the multilayer article oriented "to the outside" in the use state, i.e. toward the light source, i.e. toward the sun. In addition to the topcoat layer, there may also be a primer layer between topcoat layer and substrate layer. There may also be further layers, especially protective and functional layers, especially a second topcoat layer and optionally primer layer, on the opposite side of the substrate layer.

Something is colored if it is not white, black or gray—without any hue.

The multilayer articles of the invention are colored.

The specified properties of the titanium dioxide relate to any titanium dioxide present in the composition. This may be titanium dioxide from one batch or titanium dioxide from various batches or even various products. In these cases, the averages are formed for the respective properties. It will thus be apparent that, for example, as well as Altiris® 800 from Huntsman used in the examples, for example, Kronos 2230 may also be present, provided that the profile of properties composed of the average values corresponds to that according to the claims. More preferably not more than 40% by weight, further preferably not more than 25% by weight, even further preferably not more than 10% by weight, especially preferably not more than 5% by weight, very especially preferably not more than 2% by weight, of a titanium dioxide, based on the total amount of titanium dioxide in the composition of the invention, that on its own, i.e. without calculation for the mixture, does not have the properties specified below, especially those according to patent claim 1, is present.

The titanium dioxide has a median particle size D50, determined by means of scanning electron microscopy (STEM), of ≥0.3 μm, preferably >0.40 μm, further preferably >0.5 μm, especially preferably >0.55 μm, especially preferably 0.6 to 1.2 μm, exceptionally preferably 0.65 to 1.15 μm.

The titanium dioxide present in the composition of the substrate layer is a titanium dioxide of the rutile type to an extent of at least 60% by weight, preferably to an extent of at least 70% by weight, further preferably to an extent of at least 80% by weight, even further preferably to an extent of at least 90% by weight, especially preferably to an extent of at least 95% by weight, very especially preferably to an extent of at least 99% by weight, based in each case on the overall crystal structures of the titanium dioxide. Exceptionally preferably, the titanium dioxide is of the rutile type to an extent of 100% by weight.

The titanium dioxide present in the composition of the substrate layer has a coating containing silicon dioxide and aluminum oxide and optionally titanium dioxide, where the ratio of the sum total of the aluminum content and silicon content in atom % in the coating to the titanium content in atom % in the coating is greater than 5:1, preferably greater than 10:1, further preferably at least 15:1, even further preferably at least 20:1. Preferably, the ratio of the sum total of the aluminum content and silicon content in atom % in the coating to the titanium content in atom % in the coating at a detection angle of 10° is at least 15:1, at a detection angle of 45° is at least 19:1, further preferably at least 20:1, and at a detection angle of 80° is likewise preferably at least 20:1. It will be apparent that the coating itself may also be free of any titanium dioxide. The coating may be a mixed layer comprising the abovementioned oxides, or a sequence of the different oxide layers. Preferably, the coating has a silicon dioxide layer and an aluminum oxide layer, further preferably with the silicon dioxide layer between the titanium dioxide core and the aluminum oxide layer. Most preferably, the titanium dioxide does not have any inorganic layers other than the titanium dioxide core, the silicon dioxide layer and the aluminum oxide layer, but these may be contaminated by elements such as carbon, titanium, sodium, potassium etc. However, the titanium dioxide may also contain an organic layer as well as inorganic layers. This may comprise polysiloxanes and/or polyols. The coating is included in the total amount of the titanium dioxide in the thermoplastic composition, such that the actual proportion of titanium dioxide in the titanium dioxide component in the composition is smaller. If the composition contains, for example, 1.5% by weight of titanium dioxide, the composition does in fact contain less than 1.5% by weight of pure titanium dioxide since the coating containing aluminum oxide and silicon dioxide is also counted in the stated amount. Preferably, the proportion of pure titanium dioxide in the titanium dioxide component is at least 90% by weight, preferably at least 92% by weight, more preferably more than 93% by weight, determined to ASTM D 1394:2014.

Preferably, the titanium dioxide used for the composition of the substrate layer is exclusively that which has the features mentioned in the four paragraphs above.

The proportion of titanium dioxide including its coating in the thermoplastic composition of the substrate layer is preferably 0.05% to 2.5% by weight, further preferably 0.1% to 2.0% by weight, even further preferably 0.10% to 1.5% by weight.

The titanium dioxide used in accordance with the invention is a white pigment, $Ti(IV)O_2$. Colored titanium dioxides contain, as well as titanium, also elements such as Sb, Ni, Cr in significant amounts, so as to result in a color impression other than "white". It will be apparent that traces of other elements may also be present as impurities in the titanium dioxide white pigment. However, these amounts are so small that the titanium dioxide does not take on any hue as a result.

The coating layer preferably has a thickness of 5 to 20 μm, more preferably 8 to 17 nm, most preferably 10 to 15 nm.

The compositions of the substrate layer contain at least one organic colorant. This is preferably selected from the group consisting of those based on anthraquinone, perinone, pyrazolone, indanthrone, methine, phthalocyanine structures, and on azo or diazo dyes.

Further-preferred organic colorants are those selected from the structures (1) to (18) shown below, where preferably at least one organic colorant of these structures is present in the opaque thermoplastic polymer compositions of the invention for the substrate layer. However, it is also possible for one or more further colorants selected from the same group of colorants and/or generally from the group of colorants to be present.

With regard to the organic colorants:

Particularly preferred organic green colorants are colorants of the formulae (1) and (2a/2b/2c):

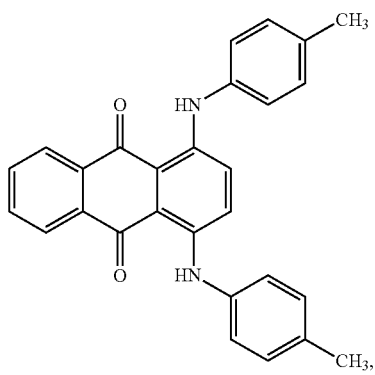

(1)

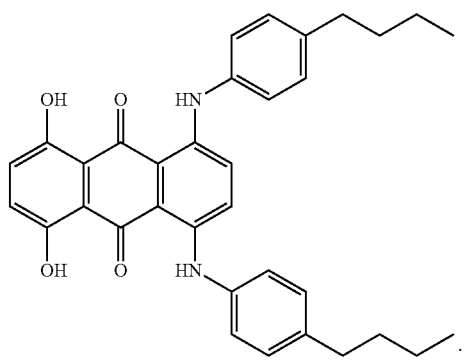

(2c)

The colorant of the formula (1) is known by the name Macrolex Green 5B from Lanxess Deutschland GmbH. Color Index number 61565. CAS number: 128-90-3, and is an anthraquinone dye.

Colorants of the formulae (2a), (2b) and (2c) are known by the name Macrolex Green G (Solvent Green 28).

Blue colorants that are used are preferably colorants of the formulae (3) and/or (4a/4b):

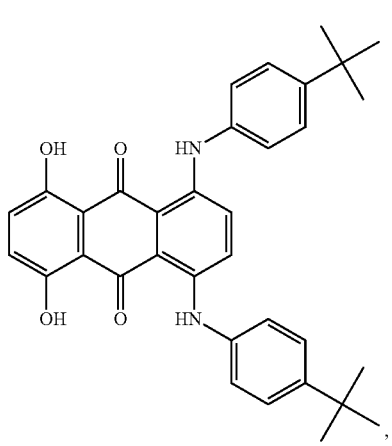

(2a)

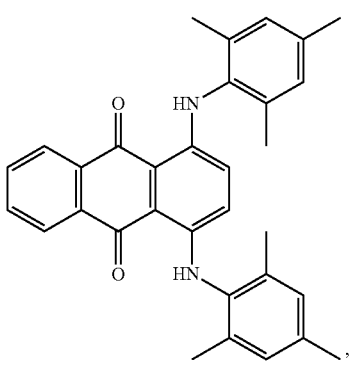

(3)

available under the "Keyplast Blue KR" name, CAS number 116-75-6,

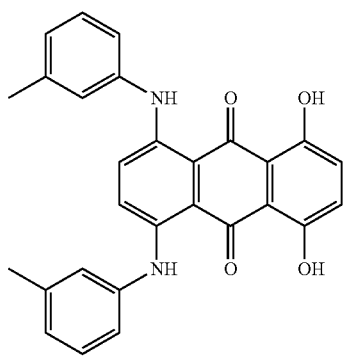

(2b)

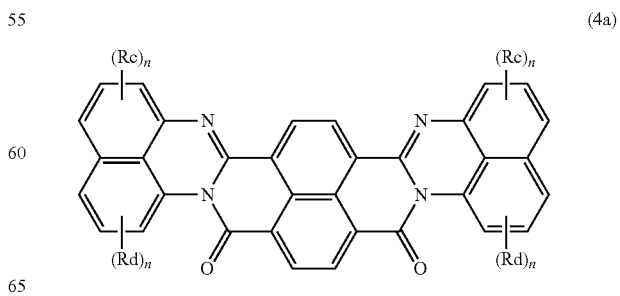

(4a)

-continued

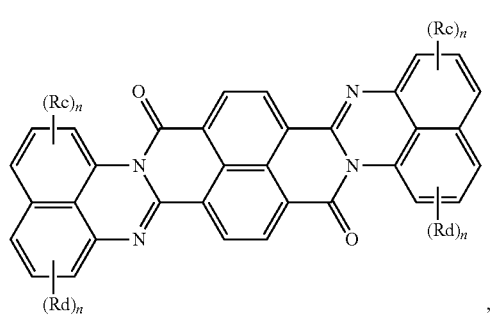
(4b)

where
- Rc and Rd are independently a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl,
- n independently of the respective R is a natural number from 0 to 3, and the radical is hydrogen when n=0.

In a preferred embodiment, Rc and/or Rd are Cl and are in o and/or p positions to the carbon atoms bearing the amine functionalities, for example di-orthochloronaphthaleno, di-ortho, mono-para-chloronaphthaleno and mono-ortho-naphthaleno. In addition, in a preferred embodiment, Rc and Rd are each a tert-butyl radical which is preferably in the meta position to the carbon atoms bearing the nitrogen functionalities.

In a particularly preferred embodiment, n=0 in all rings, and so all Rc and Rd=H.

Further usable blue colorants include:
Colorants of the formula (5) available under the "Macrolex Blue 3R Gran" name

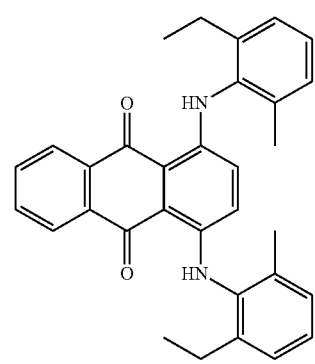
(5)

and/or colorants of the formula (6) available under the "Macrolex Blue RR" name (CAS 32724-62-2; Solvent Blue 97; C.I. 615290),

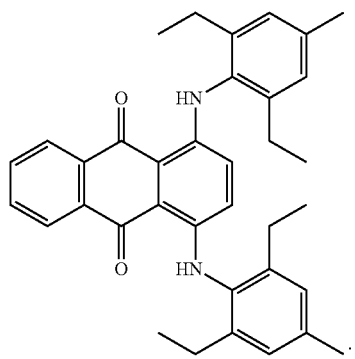
(6)

The red colorant used is preferably a colorant of the formula (7), available under the "Macrolex Red 5B" name, with CAS number 81-39-0:

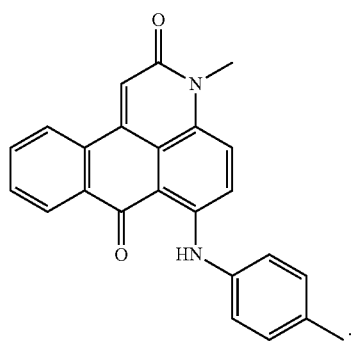
(7)

In addition, it is possible to use colorants of the formulae (8) with CAS number 71902-17-5 and (9) with CAS number 89106-94-5:

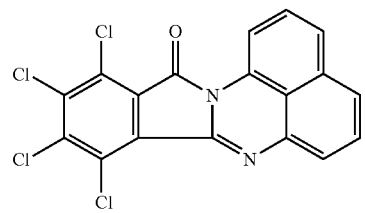
(8)

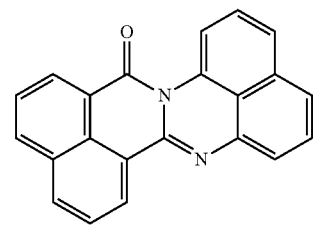
(9)

Violet colorants used with preference are colorants of the formulae (10) with CAS number 61951-89-1, (11), available under the "Macrolex Violet B" name from Lanxess AG, with CAS number 81-48-1 or (12a/12b):

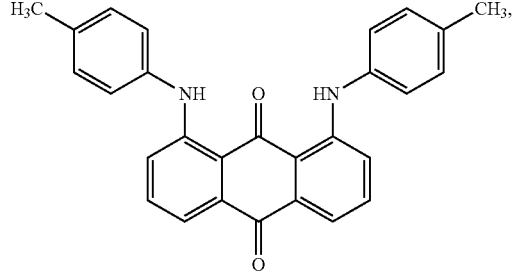

(10)

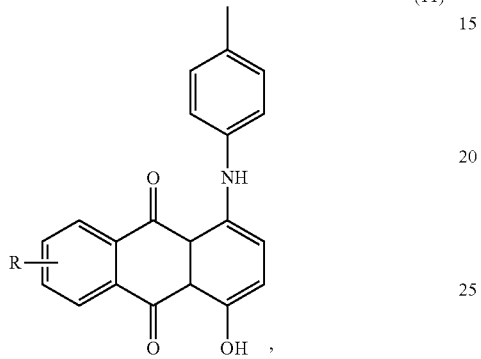

(11)

where R is selected from the group consisting of H and p-methylphenylamine radical; preferably R=H;

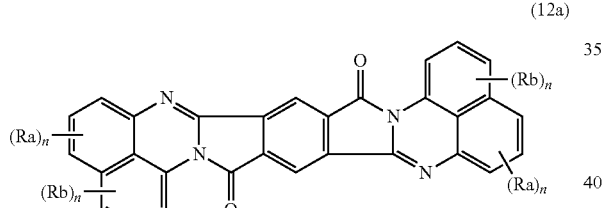

(12a)

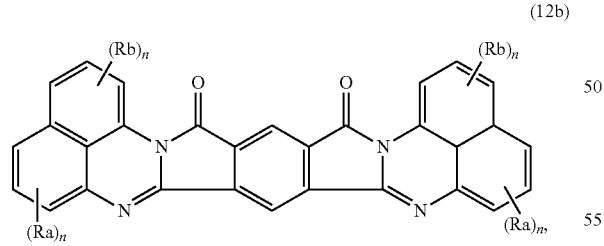

(12b)

where
Ra and Rb are independently a linear or branched alkyl radical or halogen, preferably methyl, ethyl, propyl, isopropyl, butyl, isobutyl, tert-butyl, pentyl, neopentyl, hexyl, thexyl or Cl, further preferably methyl, Cl and especially preferably Cl,
n independently of the respective R is a natural number from 0 to 3, and the radical is hydrogen when n=0.
In a preferred embodiment, Ra and/or Rb are Cl and are in o and/or p positions to the carbon atoms bearing the amine functionalities, for example di-orthochloronaphthaleno, di-ortho, mono-para-chloronaphthaleno and mono-ortho-naphthaleno. Furthermore, in a preferred embodiment, Ra and Rb are each a tert-butyl radical which is preferably in the meta position to the carbon atoms bearing the nitrogen functionalities.

In a particularly preferred embodiment, n=0 in all rings, and so all Ra and Rb=H.

It is also possible to use colorants conforming to the formula (13) available under the "Macrolex RedViolet R" name, CAS number 6408-72-6:

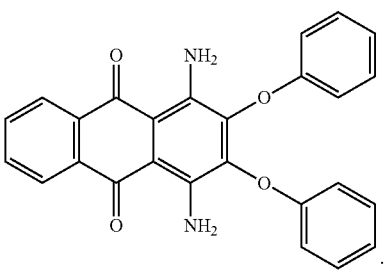

(13)

Yellow colorants used are preferably colorants of formulae (14), available under the "Macrolex Yellow 3G" name, with CAS number 4702-90-3, and/or (15) available under the "Macrolex Orange 3G" name (CAS number 6925-69-5, C.I. 564100):

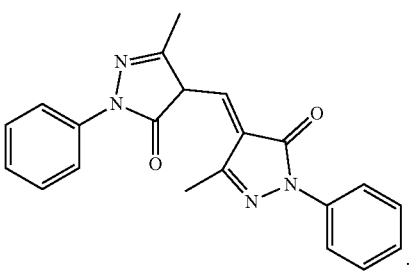

(14)

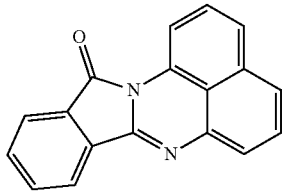

(15)

It is also possible to use colorants of the formulae (16), available under the "Oracet Yellow 180" name, with CAS number 13676-91-0. (17) with CAS number 30125-47-4, and/or (18), available under the "Oracet Orange 220: Solvent Orange 116" name, with CAS number 669005-94-1.

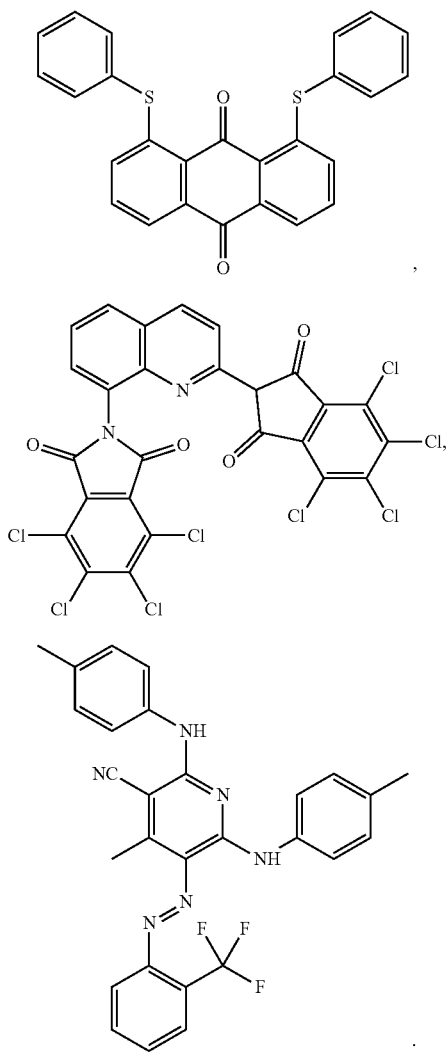

In the context of the present invention, particular preference is given to combinations of at least one colorant from those mentioned above, especially the organic colorants (1) to (18) and/or the colorants Amaplast Yellow GHS (CAS 13676-91-0; Solvent Yellow 163; C:I: 58840); Heliogen Blue grades (e.g. Heliogen Blue K 6911; CAS 147-14-8; Pigment Blue 15:1; C.I. 74160) and Heliogen Green grades (for example Heliogen Green K 8730; CAS 1328-53-6; Pigment Green 7; C.I. 74260) with titanium dioxide pigment for use in accordance with the invention and preferably at least one further organic colorant and/or inorganic colorant.

Further colorants are preferably anthraquinone-based, perinone-based, phthalocyanine-based or are colorants derived from these structures. Particularly preferred colorants are described in WO 2012/080395 A1. Most preferably, the thermoplastic composition of the substrate layer, aside from the titanium dioxide pigment, contains only one or more colorants from the group of colorants of the formulae (1) to (18), Amaplast Yellow GHS, the Heliogen Blue grades and/or the Heliogen Green grades, but no further colorants, especially also no other pigments and no carbon black.

The organic colorants disclosed in the context of the present invention, especially those of the formulae (1) to (18), are preferably used, based on the respective individual component, in amounts of 0.0010% to 1.00% by weight, preferably of 0.005% by weight to 0.80% by weight and more preferably of 0.01% by weight to 0.70% by weight in thermoplastic polymer compositions. The total concentration of organic and inorganic colorants, including pigments, except for $TiO_2$, is further preferably 0.012% to 1.2% by weight, especially preferably 0.012% to 1.0% by weight, based on a resulting polymer composition containing the organic colorants of the invention or organic colorant combinations.

The compositions preferably contain ≥0.001% by weight, preferably ≥0.01% by weight, of organic colorants.

Inorganic colorants that are suitable in principle are, for example, mixed phase oxide pigments such as iron oxides, titanates such as Cr, Sb, Zn and Ni titanates, spinel pigments, silicate-based pigments such as aluminosilicates, e.g. ultramarine.

The substrate layer may, as well as the aromatic polycarbonate or the polymethylmethacrylate on which it is based, also contain, as blend partner, one or more further thermoplastics, preferably aromatic polycarbonate including copolycarbonate, polyestercarbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), cyclic polyolefin, polyacrylate, copolyacrylate, polymethacrylate, copolymethacrylate, for example poly- or copolymethylmethacrylate (such as PMMA), copolymers with styrene, for example transparent polystyrene-acrylonitrile (PSAN), thermoplastic polyurethanes, polymers based on cyclic olefins (e.g. TOPAS®, a product commercially available from Ticona), preferably aromatic polycarbonate, copolycarbonate, polyestercarbonate, aromatic polyesters, polymethylmethacrylate or mixtures of the components mentioned, and more preferably aromatic polycarbonate and/or copolycarbonate. The thermoplastic together with all the other components of the substrate layer forms 100% by weight. Preferably 0% to a maximum of 5.0% by weight of blend partners is present, more preferably no blend partners at all. Polycarbonate including copolycarbonate, and PMMA are useful as blend partners when the base polymer of the thermoplastic composition is the respective other polymer.

Suitable polycarbonates for the production of the plastics composition of the invention are any of the known polycarbonates. These are homopolycarbonates and copolycarbonates. Where reference is made to "polycarbonates" in the context of the present invention, what are meant are preferably aromatic polycarbonates. More preferably, polyestercarbonates are excluded from the polycarbonates in context of the invention.

The suitable polycarbonates preferably have average molecular weights M w of 10 000 g/mol to 40 000 g/mol, preferably of 14 000 g/mol to 35 000 g/mol and more preferably of 16 000 g/mol to 32 000 g/mol. The M w values here are determined by gel permeation chromatography using dichloromethane as eluent, calibration with linear polycarbonates (formed from bisphenol A and phosgene) of known molar mass distribution from PSS Polymer Standards Service GmbH, Germany; calibration by method 2301-0257502-09D (from 2009, in German) from Currenta GmbH & Co. OHG, Leverkusen. The eluent for the calibration is likewise dichloromethane. Column combination of crosslinked styrene-divinylbenzene resins. Diameter of analytical columns: 7.5 mm; length: 300 mm. Particle sizes of column material: 3 µm to 20 µm. Concentration of solutions: 0.2% by weight. Flow rate: 1.0 ml/min, temperature of solutions: 30° ° C. Detection using a refractive index (RI) detector.

The melt volume flow rate (MVR), determined to ISO 1133-1:2012-03 at 300° C. with load 1.2 kg, is 7 to 40 cm³/(10 min), preferably 8 to 35 cm³/(10 min).

The polycarbonates are preferably prepared by the interfacial process or the melt transesterification process, which have been described many times in the literature.

With regard to the interfacial process, reference is made by way of example to H. Schnell, "Chemistry and Physics of Polycarbonates", Polymer Reviews, vol. 9, Interscience Publishers, New York 1964 p. 33 ff., to Polymer Reviews, vol. 10, "Condensation Polymers by Interfacial and Solution Methods", Paul W. Morgan, Interscience Publishers, New York 1965, ch. VIII, p. 325, to Drs. U. Grigo, K. Kircher and P. R-Müller "Polycarbonate" [Polycarbonates] in Becker/Braun, Kunststoff-Handbuch [Polymer Handbook], volume 3/1, Polycarbonate, Polyacetale, Polyester, Celluloseester [Polycarbonates, Polyacetals, Polyesters, Cellulose Esters], Carl Hanser Verlag, Munich, Vienna, 1992, p. 118-145, and to EP 0 517 044 A1.

The melt transesterification process is described, for example, in the "Encyclopedia of Polymer Science", Vol. 10 (1969), Chemistry and Physics of Polycarbonates, Polymer Reviews, H. Schnell, Vol. 9, John Wiley and Sons, Inc. (1964), and in patent specifications DE 10 31 512 A and U.S. Pat. No. 6,228,973 B1.

The polycarbonates are preferably prepared by reactions of bisphenol compounds with carbonic acid compounds, especially phosgene, or of diphenyl carbonate or dimethyl carbonate in the melt transesterification process.

Particular preference is given here to homopolycarbonates based on bisphenol A and copolycarbonates based on the monomers bisphenol A and 1,1-bis(4-hydroxyphenyl)-3,3,5-trimethylcyclohexane, for example Apec® from Covestro Deutschland AG.

These and further bisphenol/diol compounds that are usable for polycarbonate synthesis are disclosed inter alia in WO 2008/037364 A1 (page 7, line 21 to page 10, line 5), EP 1 582 549 A1 ([0018] to [0034]), WO 2002/026862 A1 (page 2, line 20 to page 5, line 14), WO 2005/113639 A1 (page 2, line 1 to page 7, line 20).

The polycarbonates may be linear or branched. It is also possible to use mixtures of branched and unbranched polycarbonates.

Suitable branching agents for the preparation of branched polycarbonates are known from the literature and described, for example, in the patent documents U.S. Pat. No. 4,185,009 B and DE 25 00 092 A1 (3,3-bis(4-hydroxyaryloxindoles), see whole document in each case), DE 42 40 313 A1 (see page 3, lines 33 to 55), DE 19 943 642 A1 (see page 5, lines 25 to 34) and U.S. Pat. No. 5,367,044 B and literature cited therein.

The polycarbonates used may additionally also be intrinsically branched, in which case no branching agent is added in the course of polycarbonate preparation. One example of intrinsic branches is that of so-called Fries structures, as described for melt polycarbonates in EP 1 506 249 A1.

In addition, chain terminators may be used in polycarbonate preparation. Chain terminators used are preferably phenols such as phenol, alkylphenols such as cresol and 4-tert-butylphenol, chlorophenol, bromophenol or cumylphenol or a mixture thereof.

The thermoplastic polymer compositions may, as well as the colorants of the invention and titanium dioxide, optionally also contain one or more further components. These include: UV absorbers (component iii). If present, these are preferably present in amounts of 0.10% by weight to 1.00% by weight, further preferably to 0.6% by weight, even further preferably 0.10% by weight to 0.50% by weight, and most preferably 0.10% by weight to 0.30% by weight.

Suitable UV absorbers are described, for example, in EP 1 308 084 A1, in DE 102007011069 A1 and in DE 10311063 A1.

Examples of suitable UV absorbers include the following: hydroxybenzotriazoles, such as 2-(3',5'-bis(1,1-dimethylbenzyl)-2'-hydroxyphenyl)benzotriazole (Tinuvin® 234, BASF SE, Ludwigshafen), 2-(2'-hydroxy-5'-(tert-octyl)phenyl)benzotriazole (Tinuvin® 329, BASF SE, Ludwigshafen), 2-(2'-hydroxy-3'-(2-butyl)-5'-(tert-butyl)phenyl)benzotriazole (Tinuvin® 350, BASF SE, Ludwigshafen), bis(3-(2H-benzotriazolyl)-2-hydroxy-5-tert-octyl)methane, (Tinuvin® 360, BASF SE, Ludwigshafen), (2-(4,6-diphenyl-1,3,5-triazin-2-yl)-5-(hexyloxy)phenol (Tinuvin® 1577, BASF SE, Ludwigshafen), the benzophenones 2,4-dihydroxybenzophenone (Chimasorb® 22, BASF SE, Ludwigshafen) or 2-hydroxy-4-(octyloxy) benzophenone (Chimassorb® 81, BASF SE, Ludwigshafen), cyano-3,3-diphenyl-2-propenoic acid, 2,2-bis [[(2-cyano-1-oxo-3,3-diphenyl-2-propenyl)oxy]methyl]-1, 3-propanediyl ester (9CI) (Uvinul® 3030, BASF SE, Ludwigshafen), 2-[2-hydroxy-4-(2-ethylhexyl)oxy]phenyl-4,6-di(4-phenyl)phenyl-1,3,5-triazine (CGX UVA 006, BASF SE, Ludwigshafen), 2-(5-chloro-2H-benzotriazol-2-yl)-6-(1,1-dimethylethyl)-4-methylphenol (Tinuvin 326) or tetraethyl 2,2'-(1,4-phenylenedimethylidene)bismalonate (Hostavin® B-Cap, Clariant AG). It is also possible to use mixtures of these ultraviolet absorbers.

In a particularly preferred embodiment, the polymer composition of the substrate layer contains at least one UV absorber as component iii). Most preferably, the mixture contains 2-(5-chloro-2H-benzotriazol-2-yl)-6-(1,1-dimethylethyl)-4-methylphenol (Tinuvin 326) or 2,4,6-tris(2-hydroxy-4-hexyloxy-3-methylphenol)-1,3,5-triazine, known by the ADK STAB LA-F70 trade name from Adeka Palmerole.

The polymer composition preferably contains at least one thermal stabilizer as component iv). The amount of thermal stabilizer is preferably up to 0.20% by weight, further preferably 0.01% to 0.10% by weight, even further preferably 0.01% to 0.05% by weight, especially preferably 0.015% to 0.040% by weight, based on the overall composition.

Preferred thermal stabilizers are phosphites and phosphonites, and also phosphines. Examples include triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-dicumylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl)-4,4'-biphenylenediphosphonite, 6-isooctyloxy-2,4,8,10-tetratert-butyl-12H-dibenzo[d,g]-1,3,2-dioxaphosphocine, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methylibenzo[d,g]-1,3,2-dioxaphosphocine, 2,2',2"-nitrilo[triethyltris(3,3',5,5'-tetratert-butyl-1, 1'-biphenyl-2,2'-diyl) phosphite], 2-ethylhexyl (3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, bis(2,6-di-tert-butyl-4-methylphenyl)pentaerythritol diphosphite, triphenylphosphine (TPP), trialkylphenylphosphine, bisdiphenylphosphinoethane or a trinaphthylphosphine. Especially preferably, triphenylphosphine (TPP), Irgafos® 168 (tris(2,4-di-tert-butylphenyl) phosphite) or tris(nonylphenyl) phosphite or mixtures thereof are used.

It is also possible to add alkyl phosphates, for example mono-, di- and/or trihexyl phosphate, triisooctyl phosphate and/or trinonyl phosphate. The alkyl phosphate used is preferably triisooctyl phosphate (tris-2-ethylhexyl phosphate). It is also possible to use mixtures of various mono-, di- and trialkyl phosphates. If alkyl phosphates are used, these are preferably used in an amount of less than 0.05% by weight, further preferably of 0.00005% to 0.05% by weight, even further preferably of 0.0002% to 0.05% by weight, especially preferably of 0.0005% to 0.03% by weight, very especially preferably of 0.001% to 0.0120% by weight, based on the overall composition.

It is also possible to use phenolic antioxidants such as alkylated monophenols, alkylated thioalkylphenols, hydroquinones and alkylated hydroquinones. Particular preference is given to using Irganox® 1010 (pentaerythritol 3-(4-hydroxy-3,5-di-tert-butylphenyl)propionate; CAS: 6683-19-8) and Irganox 1076® (2,6-di-tert-butyl-4-(octadecanoxycarbonylethyl)phenol).

The composition preferably contains, as component v, demolding agents, further preferably based on a fatty acid ester, even further preferably based on a stearic ester, especially preferably based on pentaerythritol. Particular preference is given to using pentaerythritol tetrastearate (PETS) and/or glycerol monostearate (GMS). If one or more demolding agents are used, the amount is preferably up to 1.0% by weight (inclusive), further preferably 0.01% to 0.50% by weight, especially preferably 0.01% to 0.40% by weight, based in each case on the overall composition.

It is optionally possible to use, as component vi, additives, optionally in addition to the one or more UV absorbers and/or thermal stabilizers and/or demolding agents according to components iii to v, preferably 0.0% by weight to 10.0% by weight, further preferably to 5.0% by weight, even further preferably 0.01% by weight of 3.00% by weight, more preferably 0.01% to 1.00% by weight, of further additives. Components iii to v are explicitly excluded from this component vi. The same applies to components i (titanium dioxide) and ii (organic colorant). Such additives are described for example in EP-A 0 839 623, WO-A 96/15102, EP-A 0 500 496 or "Plastics Additives Handbook", Hans Zweifel, 5th Edition 2000, Hanser Verlag, Munich, for example flame retardants, anti-dripping agents, optical brighteners, flow improvers or processing auxiliaries. In this connection, the substances already disclosed as components of the present invention are explicitly not part of this component.

The polymer composition in any case contains two colorants, of which neither of the at least two colorants is carbon black. The polymer composition may, however, optionally contain carbon black as a further additive. The carbon black in this case is preferably finely dispersed in the organic polymer matrix and is preferably in nanoscale form. Suitable carbon blacks have an average particle size of preferably less than 100 nm, further preferably less than 75 nm, even further preferably less than 50 nm and more preferably less than 40 nm, the average particle size preferably being greater than 0.5 nm, further preferably greater than 1 nm and more preferably greater than 5 nm. The particle size is determined by TEM (transmission electron microscopy). Carbon black is explicitly excluded from the (other) organic and inorganic colorants that may be present in the compositions of the invention. The compositions of the invention preferably contain less than 0.01% by weight, further preferably <0.005% by weight, even further preferably <0.001% by weight, of carbon black; they are more preferably free of carbon black.

The amounts stated above are each based on the overall polymer composition.

The polymer compositions of the invention comprising the abovementioned components are produced by standard methods of incorporation by combining, mixing and homogenizing, with the homogenization in particular preferably taking place in the melt with application of shear forces. Combination and mixing is optionally effected prior to melt homogenization using powder premixtures.

It is also possible to use premixtures which have been produced from solutions of the mixture components in suitable solvents, wherein homogenization is optionally effected in solution and the solvent is then removed. It is especially possible here to introduce the components of the composition of the invention by known methods, including as a masterbatch.

The use of masterbatches and of powder mixtures or compacted premixtures is especially suitable for introduction of the abovementioned additives. It is optionally possible here to premix all the aforementioned components. Alternatively, however, premixtures and masterbatches of colorants and any other combinations are also possible. In all cases, for better meterability in the production of the thermoplastic polymer compositions, the aforementioned component premixtures are preferably made up with pulverulent polymer component, aromatic polycarbonate or PMMA according to the main component of the thermoplastic composition, in such a way as to result in easily handled overall volumes.

In a particular embodiment, the abovementioned components may be mixed to give a masterbatch, in which case the mixing preferably takes place in the melt under the action of shear forces (for example in a kneader or twin-screw extruder). This method offers the advantage that the components are better distributed in the polymer matrix. For production of the masterbatch, the polymer matrix chosen is preferably the thermoplastic that also constitutes the main component of the ultimate overall polymer composition.

In this context, the composition can be combined, mixed, homogenized and then extruded in standard apparatuses such as screw extruders (for example twin-screw extruders (TSE)), kneaders or Brabender or Banbury mills. After extrusion, the extrudate may be chilled and comminuted.

The multilayer article comprises not only the substrate layer but also one or more topcoat layers c. In the sense of the invention, these layers preferably fulfil the function of scratch resistance layers and/or weathering protection layers. The topcoat layers have been applied either on one or both sides. Optionally together with the primer layer, they cover part of the surface of the substrate layer or else the entire substrate layer. Preferably, at least part of the surface of the substrate layer has a corresponding coating, relating to the surface visible to the outside in the desired application.

The topcoat layer c preferably consists of a scratch-resistant varnish (hardcoat, topcoat). This may, for example, be an epoxy varnish, acrylic varnish, including urethane acrylate varnish, polysiloxane varnish, colloidal silica gel varnish or an inorganic/organic hybrid system-based varnish. This is further preferably a polysiloxane varnish, even further preferably produced by the sol-gel process. The topcoat layer c more preferably also contains at least one UV absorber, for example derived from benzophenones, triazoles or triazines. The topcoat layer c preferably has high abrasion and scratch resistance and hence especially fulfills the function of a scratch-resistant coating. The proportion of UV absorber in the topcoat layer is preferably 5% to 15% by weight, further preferably 8% to 12% by weight, based on the total weight of the topcoat layer.

Multiple executions are possible for the multilayer article. Commercially available systems for the topcoat layer c are, for example, AS4000, SHC5020 and AS4700 from Momentive Performance Materials. Such systems are described for example in U.S. Pat. No. 5,041,313 A, DE 3,121,385 A1, U.S. Pat. No. 5,391,795 A and WO 2008/109072 A1. These materials are typically synthesized via condensation of alkoxy- and/or alkylalkoxysilanes under acid or base catalysis. Nanoparticles can optionally be incorporated. Preferred solvents are alcohols such as butanol, isopropanol, methanol, ethanol and mixtures of these.

Various methods for producing a scratch-resistant coating on plastics articles are known. These systems may be applied, for example, by dipping processes, spin-coating, spraying processes or flow coating, preferably by dipping or flow processes. Curing can be effected thermally or by UV irradiation. The scratch-resistant coating may be applied, for example, directly or after preparation of the substrate surface with a primer (primer layer b). The primer layer, alternatively or additionally to the topcoat layer, more preferably also contains at least one UV absorber, for example derived from benzophenones, triazoles or triazines. A scratch-resistant coating may also be applied via plasma-assisted polymerization methods, for example via an $SiO_2$ plasma. Antifogging or antireflection coatings may likewise be produced via plasma methods. It is additionally possible to use certain injection molding processes, for example overmolding of surface-treated films, to apply a scratch-resistant coating on the resulting shaped article.

The protective layer as part of the multilayer article comprising at least the topcoat layer may thus be a single- or multilayer system and hence also a combination of two or more layers, etc. More particularly, the protective layer may consist of the layers topcoat layer c and primer layer b, with the primer layer b arranged between topcoat layer c and substrate layer a.

In a preferred embodiment which achieves particularly good weathering stability, the protective layer comprises a
A) polysiloxane-based scratch-resistant coating (topcoat layer c) comprising
  i. at least one UV absorber from the group of benzophenones, resorcinols, 2-(2-hydroxyphenyl)benzotriazoles, hydroxyphenyl-s-triazines, 2-cyanoacrylates, oxalanilides
    and/or a UV inhibitor from the group of sterically hindered amines (HALS), in particular based on 2,2,6,6-tetramethylpiperidine or derivatives thereof;
  ii. at least one combination of an organomodified silane with a silica sol, wherein the organomodified silane is preferably a methyltrialkoxy- or dimethyldialkoxysilane;
and optionally, in a further-preferred embodiment, additionally a primer layer (layer b) which is disposed atop the substrate layer and acts as adhesion promoter between the polysiloxane-based scratch-resistant coating and the substrate layer, comprising
  at least one UV absorber from the group of benzophenones, resorcinols, 2-(2-hydroxyphenyl)benzotriazoles, hydroxyphenyl-s-triazines, 2-cyanoacrylates, oxalanilides and/or sterically hindered amines (HALS), especially based on 2,2,6,6-tetramethylpiperidine and derivatives thereof,
  wherein
  the thickness of the primer layer is 0.3 µm to 8 µm, preferably 1.1 µm to 4.0 µm.

According to the invention, "derivatives" here and hereinafter are understood to mean those compounds having a molecular structure that has, in place of a hydrogen atom or a functional group, a different atom or a different group of atoms or in which one or more atoms/groups of atoms has/have been removed. The parent compound is thus still recognizable.

If the thermoplastic polymer on which the composition used for the substrate layer is based is an aromatic polycarbonate, preference is given to using a UV absorber-containing primer for the primer layer b in order to improve the adhesion of the scratch-resistant coating on the substrate layer. The primer preferably contains further stabilizers, for example HALS systems (stabilizers based on sterically hindered amines), adhesion promoters and/or flow enhancers. The respective resin forming the base material of the primer layer b may be selected from a multitude of materials and is described, for example, in Ullmann's Encyclopedia of Industrial Chemistry, 5th Edition, vol. A18, pp. 368-426, VCH, Weinheim 1991. It is possible to use polyacrylates, polyurethanes, phenol-based systems, melamine-based systems, epoxy systems and alkyd systems, and mixtures of these systems. The resin is usually dissolved in suitable solvents—often in alcohols. Depending on the resin chosen, hardening can be effected at room temperature or at elevated temperatures. Preference is given to using temperatures between 50° ° C. and 140° ° C.—often after a large part of the solvent has been removed over a short period at room temperature. Examples of commercially available primer systems include SHP470, SHP470-FT2050 and SHP401 from Momentive Performance Materials. Such coatings are described, for example, in U.S. Pat. No. 6,350,512 B1, U.S. Pat. No. 5,869,185 A, EP 1308084 A1 and WO 2006/108520 A1.

The polysiloxane layer preferably contains organosilicon compounds having the formula $R_nSiX_{1-n}$ and/or partial condensates thereof,
  where the R radicals are the same or different and are a linear or branched, saturated or mono- or polyunsaturated or aromatic hydrocarbyl radical,
  the X radicals are the same or different and are hydrolyzable groups or hydroxyl groups, preferably halogen, especially chlorine or bromine, alkoxy groups, alkylcarbonyl groups or acyloxy groups and n is 0, 1, 2 or 3, preferably 1 or 2, most preferably 1.

R preferably represents saturated, branched or unbranched alkyl radicals having 1 to 20 carbon atoms and/or represents mono- or polyunsaturated branched or unbranched alkenyl radicals having 2 to 20 carbon atoms or aromatic groups having 6 to 12 carbon atoms. The alkyl/alkenyl radicals further preferably have up to 12, still further preferably up to 8, carbon atoms. More preferably, all radicals are methyl and/or phenyl radicals.

More preferably, X is an alkoxy group, most preferably a C1- to C4-alkoxy group, for example a methoxy group or an ethoxy group.

The silicon compounds $R_nSiX_{4-n}$ are hydrolyzable and condensable via the X radicals. These hydrolytically condensable groups are used to construct an inorganic network comprising Si—O—Si units. In contrast to the X radicals, the R radicals are stable to hydrolysis under the typical condensation conditions.

When using the aforementioned siloxane-based topcoat systems, dry layer thicknesses of 3 µm-20 µm are preferred, further preferably 5 µm-15 µm, especially preferably 6 µm-12 µm. "Dry layer thickness" means the layer thickness of the topcoat layer c after application, evaporation of the solvent and subsequent thermal or UV curing. The layer thickness may be determined, for example, by white light interferometry (for example by means of a white light interferometer from Eta Optic; ETA-SST), which is preferred. Cross section preparation and microscope detection (by optical microscopy or scanning electron microscopy) of the layers may also be used to detect the thickness via material contrast.

As described above, rather than primer/scratch-resistant coating combinations, it is also possible to use one-component hybrid systems as topcoat layer c, either in thermally curable or UV-curable form, for the multilayer articles.

These are described, for example, in EP 0570165 A2, WO 2008/071363 A2 or DE 2804283 A.

Commercially available hybrid systems are known, for example, under the PHC 587, PHC 587C names as thermally curing systems.

Preferred multilayer articles of the invention are those comprising
a) a substrate layer having light transmittance in the range from 380 to 780 nm of less than 0.5%, determined at a sheet thickness of 4 mm to DIN ISO 13468-2:2006 (D65, 10°),
consisting of a thermoplastic composition comprising at least 85% by weight of polymethylmethacrylate or aromatic polycarbonate, preferably aromatic polycarbonate,
and
i) 0.05% to 2.5% by weight of titanium dioxide white pigment,
which has a rutile content of >99% by weight and a median particle size D50, determined by means of scanning electron microscopy, of 0.4 µm to 2.5 µm, and
wherein the titanium dioxide has a coating containing silicon dioxide, aluminum oxide and optionally titanium dioxide, and wherein the ratio of the sum total of the aluminum content and silicon content in atom % in the coating to the titanium content in atom % in the coating is greater than 5:1,
ii) at least two colorants that are either one organic colorant and one inorganic colorant or two organic colorants, wherein the inorganic colorant is not a titanium dioxide and not a carbon black,
b) optionally a primer layer and
c) a topcoat layer,
wherein the primer layer and/or the topcoat layer contains at least one UV absorber.

Further-preferred multilayer articles of the invention are those comprising
a) a substrate layer having light transmittance in the range from 380 to 780 nm of less than 0.5%, preferably of less than 0.10%, determined at a sheet thickness of 4 mm to DIN ISO 13468-2:2006 (D65, 10°),
consisting of a thermoplastic composition comprising at least 95% by weight of polymethylmethacrylate or aromatic polycarbonate, preferably aromatic polycarbonate,
and
i) 0.1% to 2.0% by weight of titanium dioxide white pigment,
which has a rutile content (based on the crystal structure of the titanium dioxide) of >99% by weight and a median particle size $D_{50}$, determined by means of scanning electron microscopy, of 0.4 µm to 2.5 µm, and
wherein the titanium dioxide has a coating containing silicon dioxide, aluminum oxide and optionally titanium dioxide, and wherein the ratio of the sum total of the aluminum content and silicon content in atom % in the coating to the titanium content in atom % in the coating is greater than 10:1,
ii) at least two colorants that are either one organic colorant and one inorganic colorant or two organic colorants, wherein the inorganic colorant is not a titanium dioxide and not a carbon black,
b) optionally a primer layer and
c) a topcoat layer,
wherein the primer layer and/or the topcoat layer contains at least one UV absorber.

Even further-preferred multilayer articles are those comprising
a) a substrate layer having light transmittance in the range from 380 to 780 nm of less than 0.10%, determined at a sheet thickness of 4 mm to DIN ISO 13468-2:2006 (D65, 10°),
consisting of a thermoplastic composition comprising at least 95% by weight of polymethylmethacrylate or aromatic polycarbonate, preferably aromatic polycarbonate,
and
i) 0.1% to 1.5% by weight of titanium dioxide white pigment,
which has a rutile content of >99% by weight and a median particle size D50, determined by means of scanning electron microscopy, of 0.65 µm to 1.15 µm, and
wherein the titanium dioxide has a coating containing silicon dioxide, aluminum oxide and titanium dioxide, and wherein the ratio of the sum total of the aluminum content and silicon content in atom % in the coating to the titanium content in atom % in the coating of the titanium dioxide is at least 18:1,
ii) at least two colorants that are either one organic colorant and one inorganic colorant or two organic colorants, wherein the inorganic colorant is not a titanium dioxide and not a carbon black, wherein the organic colorant present is at least one from the group of the above-illustrated colorants (1), (2a), (2b), (2c), (3), (4a), (4b), (5), (6), (7), (8), (9), (10), (11), (12a), (12b), (13), (14), (15), (16), (17), (18), Amaplast Yellow GHS with CAS number 13676-91-01, one from the Heliogen Blue series or the Heliogen Green series,
b) optionally a primer layer and
c) a topcoat layer, wherein the primer layer and/or the topcoat layer contains at least one UV absorber.

More preferably, the composition further comprises no further components apart from one or more further additives selected from the group consisting of UV absorbers, demolding agents, thermal stabilizers, antistats, blend partners and flow improvers; most preferably, it comprises at least one UV absorber. Colorants present in the substrate layer are most preferably merely those of the formulae (1) to (18), Amaplast Yellow GHS, the Heliogen Blue grades or the Heliogen Green grades.

The thickness of the substrate layer, especially in the aforementioned embodiments, is preferably 0.2 to 10.0 mm, further preferably 0.5 to 8.0 mm, even further preferably 1.0 to 6.0 mm.

More preferably, in the abovementioned embodiments, the topcoat layer is polysiloxane-based with a dry layer thickness of 3 to 20 µm.

The multilayer articles of the invention, composed of substrate layer and topcoat layer and optionally further layers, may be produced by (co)extrusion, direct skinning, direct coating, insert molding, in-mold coating, or other suitable methods known to the person skilled in the art.

Injection molding methods are well known to those skilled in the art and are described, for example, in "Handbuch Spritzgießen" [Injection Molding Handbook], Friedrich Johannaber/Walter Michaeli, Munich; Vienna: Hanser, 2001, ISBN 3-446-15632-1 or in "Anleitung zum Bau von Spritzgießwerkzeugen" [Introduction to the Construction of Injection Molds], Menges/Michaeli/Mohren, Munich; Vienna: Hanser, 1999, ISBN 3-446-21258-2.

Extrusion methods are known to the person skilled in the art and are described by way of example in the case of coextrusion inter alia in EP 0 110 221 A2, EP 0 110 238 A2 and EP 0 716 919 A2. For details of the adapter and die method see Johannaber/Ast: "Kunststoff-Maschinenführer" [Guide to Plastics Processing Machines], Hanser Verlag, 2000 and in Gesellschaft Kunststofftechnik: "Coextrudierte Folien und Platten: Zukunftsperspektiven, Anforderungen, Anlagen und Herstellung, Qualitätssicherung" [Plastics Technology Society: "Coextruded Films and Sheets: Future Perspectives, Requirements, Equipment and Production, Quality Assurance"], VDI-Verlag, 1990.

As well as the multilayer article of the invention, the invention also relates to corresponding products consisting of the multilayer articles of the invention or comprising the multilayer articles of the invention.

Such products, shaped bodies or shaped objects that are preferred in accordance with the invention and are composed of or comprise multilayer articles of the invention are, for example, products used in construction applications, especially for outdoor use, such as downpipes and window frames, and also those in automotive applications such as roof modules, outdoor and indoor covers (e.g. bezels), spoilers and mirror housings, and other chassis components and generally vehicle exterior parts, i.e. including exterior parts of, for example, rail vehicles and aircraft. Moreover, the multilayer articles of the invention may be used for housings or housing elements for outdoor use, for example electrical switchgear boxes, antennas or antenna elements, for instance for 4G or 5G technology, for housings or housing elements of mobile communications base stations, for instance for 4G or 5G technology, pipes etc., for toys and playing equipment for outdoor use, and likewise for lamp covers for the interior of vehicles and buildings, lamp covers for outdoor use, for example covers of streetlights. The compositions of the invention may be used for solid boards, but also for twin-wall sheets or multiwall sheets.

EXAMPLES

There follows a detailed description of the invention with reference to working examples, and the methods of determination described here are employed for all corresponding parameters in the present invention, in the absence of any statement to the contrary.

Determination Methods:

The determination methods for the properties specified hereinafter are also applicable elsewhere in the description, unless stated otherwise there. Conversely, the remarks relating to the determination methods in the rest of the examples section are applicable, unless stated otherwise hereinafter.

Melt volume flow rate (MVR) was determined according to ISO 1133:2012-03 (at a testing temperature of 300° ° C., mass 1.2 kg) using the Zwick 4106 instrument from Zwick Roell.

Color in transmission was determined with a Lambda 900 spectrophotometer from Perkin Elmer with a photometer sphere in accordance with ASTM E1348-15 with the weighting factors and formulae described in ASTM E308-08.

Transmission measurements (transmission in the VIS region, 380 to 780 nm) were conducted on a Lambda 900 spectrophotometer from Perkin Elmer with a photometer sphere according to ISO 13468-2: 2006 (i.e. determination of total transmission by measurement of diffuse transmission and direct transmission).

Color change: The samples were measured in reflection according to ASTM E 1331-04. This is used to calculate the color values L*, a*, b* in the CIELAB 1976 color space according to ASTM E 308-08 for the D65 illuminant and the 10° observer.

Yellowness index (Y.I.) was determined according to ASTM E 313-15 (observer: 10°/illuminant: D65) on specimen plaques having a sheet thickness of 4 mm.

Gloss Measurement

The surface properties were assessed by conducting gloss measurements. For this purpose, the samples were inserted into a gloss measuring instrument and gloss was measured at 60° (ASTM D 2457-08).

Artificial weathering with xenon illumination was conducted according to standard ASTM G 155-13 in a CI 5000 xenon weatherometer from Atlas on color specimen plaques (see production of the test specimens). The UV filters used were two borosilicate glass filters. The incident intensity was 0.75 W/m²/nm at 340 nm. The black standard temperature was 80° C., the sample space temperature 40° C. The samples were irrigated for 18 min every 120 min, with the illumination left switched on during the irrigation phase as well. The aforementioned weathering method is referred to hereinafter as "Xe Wom 0.75 W".

Visual color impression is determined by the naked eye using color specimen plaques (see production of the test specimens). For this purpose, the color specimen plaques were viewed before a white background in daylight and assessed correspondingly.

Materials for Production of the Test Specimens:

Titanium Dioxide for Comparative Examples:

Kronos 2230 from Kronos Worldwide Inc. This titanium dioxide type features the following characteristics: Titanium dioxide of the rutile type in an amount of more than 93.0% by weight in Kronos 2230; median particle diameter (D50, determined by means of scanning electron microscopy (STEM)) about 0.2 µm. The outer inorganic layer having a thickness of about 10 nm contains a homogeneous mixture of titanium dioxide and silicon/aluminum oxides (determined by means of x-ray photon electron spectroscopy; XPS). The ratio of silicon+aluminum to titanium, in each case in atom %, is about 1:1.

Titanium Dioxide for Inventive Examples:

Altiris 550 from Huntsman. This titanium dioxide type features the following characteristics: Titanium dioxide of the rutile type; median particle diameter (D50, determined by means of scanning electron microscopy (STEM)) about 0.7 µm, determined by means of scanning electron microscopy (STEM). The outer layer having a thickness of about 10 to 15 nm comprises a mixture of titanium dioxide and silicon/aluminum oxides having an elevated proportion of silicon and aluminum oxides (determined by means of x-ray photon electron spectroscopy; XPS). The ratio of the sum total of silicon+aluminum to titanium, in each case in atom %, in the coating is about 20:1. This ratio is also found at a detection angle of 45°.

Altiris 800 from Huntsman. This titanium dioxide type features the following characteristics: Titanium dioxide of the rutile type; median particle diameter (D50, determined by means of scanning electron microscopy (STEM)) about 1.1 µm, determined by means of scanning electron microscopy (STEM). The outer layer having a thickness of about 10-15 nm comprises a mixture of titanium dioxide and silicon/aluminum oxides having an elevated proportion of silicon and aluminum oxides (determined by means of x-ray photon electron spectroscopy; XPS). The ratio of the sum total of silicon+aluminum to titanium, in each case in atom %, in the coating is about 20:1. This ratio is also found at a detection angle of 45°.

PC1:

Composition consisting of polycarbonate from Covestro Deutschland AG with an MVR of about 12 cm$^3$/(10 min), measured at 300° C. with a load of 1.2 kg (to ISO 1133-1: 2012-03), based on bisphenol A and terminated by phenol, and 0.20% by weight of Tinuvin 329 (UV absorber) and 0.30% by weight of pentaerythritol tetrastearate (demolding agent).

PC2:

Polycarbonate from Covestro Deutschland AG having an MVR of about 12 cm$^3$/(10 min), measured at 300° C. and load 1.2 kg (to ISO 1133-1:2012-03) and based on bisphenol A and terminated by phenol. The polycarbonate does not contain any further additives.

PC3:

Polycarbonate from Covestro Deutschland AG having an MVR of about 6 cm$^3$/(10 min), measured at 300° C. and load 1.2 kg (to ISO 1133-1:2012-03) and based on bisphenol A and terminated by phenol. The polycarbonate does not contain any further additives.

PC4:

Polycarbonate from Covestro Deutschland AG having an MVR of about 12 cm$^3$/(10 min), measured at 300° C. and load 1.2 kg (to ISO 1133-1:2012-03) and based on bisphenol A and terminated by phenol, containing 0.30% by weight of pentaerythritol tetrastearate (demolding agent).

Colorants of Structure 12a and 12b with n=0 (No Substituents), 1:1 Mixture:

An initial charge of 5.62 g (0.025 mol) of benzene-1,2,4,5-tetracarboxylic dianhydride and 7.99 g (0.05 mol) of 1,8-diaminonaphthalene in 75 ml of N-ethylpyrrolidone at room temperature was heated gradually to 150° C. The mixture was stirred at this temperature for 5 hours. After cooling, 125 ml of water was added and the precipitate was filtered off. The precipitate was repeatedly suspended in water and washed in this way. The precipitate was dried under high vacuum at 80° C. The dried precipitate was admixed with a mixture of 50 ml of glacial acetic acid and 25 ml of acetic anhydride. The mixture was boiled under reflux for 4 hours. After cooling, the reaction mixture was added to 500 ml of water. The precipitate was filtered off, washed with water and dried under high vacuum at 80° C. 12.5 g of purple powder was obtained.

Bayferrox 110 M:

Micronized, yellowish iron oxide red pigment having CAS number 001309-37-1 from Lanxess Deutschland GmbH.

Colortherm Red 130M:

Heat-stable, micronized iron oxide red pigment having CAS number 001309-37-1 from Lanxess Deutschland GmbH.

Elftex 570 Pearls:

Carbon black for the coloring of plastics from Cabot Corp.

Yellow 3G:

MACROLEX® Yellow 3G, Solvent Yellow 93 pyrazolone dye from Lanxess Deutschland GmbH.

Heliogen Blue K7104 LW:

Heliogen® Blue K 7104 LW, copper phthalocyanine-based pigment, Pigment Blue 15:4 with CAS number 147-14-8 from BASF SE, Ludwigshafen, Germany.

Heliogen Green K8730:

Chlorinated copper phthalocyanine with CAS number 132-53-5 from BASF SE, Ludwigshafen, Germany.

Heucodur Blue 2R:

Cobalt aluminum blue spinel with CAS number 1345-16-0 from Heubach GmbH, Germany.

Lamp Black 101:

Carbon black for the coloring of plastics from The Cary Company 1195 W. Fullerton Ave, Addison IL 60101.

Macrolex Red EG:

Solvent Red 135 perinone dye from Lanxess Deutschland GmbH.

Macrolex Yellow 6G:

Solvent Yellow 179 methine dye from Lanxess Deutschland GmbH.

Macrolex® Yellow G. Gran.:

Solvent Yellow 114; Disperse Yellow 54 quinophthalone dye from Lanxess Deutschland GmbH.

Oracet Yellow 180 (Oracet Yellow GHS):

Anthraquinone dye, Solvent Yellow 163 from BASF SE, Ludwigshafen, Germany.

Paliogen Blue 6385:

Paliogen Blue L 6385 (Pigment Blue 60) with CAS number 81-77-6 from BASF SE, 67065 Ludwigshafen, Germany. This colorant has a bulk volume of 7 l/kg, a pH of 6-9 and a specific surface area of 40 m$^2$/g.

Sicotan Yellow K1010:

Ni/Sb/Ti oxide with CAS number 8007-18-9 from BASF SE, Ludwigshafen, Germany.

Sicotan Yellow K2107:

Cr/Sb/Ti oxide with CAS number 68186-90-3 from BASF SE, Ludwigshafen, Germany.

Ultramarine Blue Nubix F-70:

Pigment Blue 29 with CAS number 057455-37-5 from Nubiola (Ferro Corp.; Mayfield Heights, Ohio, USA).

Triphenylphosphine:

Triphenylphosphine (TPP), Sigma-Aldrich, 82018 Taufkirchen, Germany.

Black Pearls 800:

Black Pearls® 800, CAS number 1333-86-4; particle size about 17 nm; from Cabot Corp.

Richnox B900:

Mixture of Richfos 168 (80% by weight) and Richox 1076 (20% by weight), Richfos 168 being tris(2,4-di-tert-butylphenyl) phosphite with CAS number 31570-04-4 and Richnox 1076 being octadecyl 3-(3,5-di-tert-butyl-4-hydroxyphenyl)propionate; Rich Yu Chemical B.V., The Netherlands.

Tinuvin 326:

2-(5-Chloro-2H-benzotriazol-2-yl)-6-(1,1-dimethylethyl)-4-methylphenol with CAS number 3896-11-5 from BASF SE, Ludwigshafen, Germany.

Tinuvin 329:

Tinuvin® 329; 2-(2-hydroxy-5-tert-octylphenyl)benzotriazole with CAS number 3147-75-9 from BASF SE, Ludwigshafen, Germany.

TOF:

Triisooctyl phosphate (TOF; tris-2-ethylhexyl phosphate) with CAS number 78-42-2. Disflamoll TOF from Lanxess Deutschland GmbH.

Production of the Thermoplastic Polymer Compositions by Compounding:

The additives were compounded with the amounts of components specified in the examples on a KraussMaffei Berstorff ZE25 twin-screw extruder at a barrel temperature of 260° C. or a melt temperature of 270° C. and at a speed of 100 rpm at a throughput of 10 kg/h. First of all, for better mixing, a powder mixture (10% by weight of powder mixture, based on the overall composition) containing the additives was made up here. This powder mixture was metered into the remaining polycarbonate in the course of compounding.

Production of the Test Specimens:

The pelletized material was dried at 120° C. under reduced pressure for 3 hours and then processed on an Arburg 370 injection molding machine with a 25 injection unit at a melting temperature of 300° ° C. and a mold temperature of 90° ° C. to give color specimen plaques of dimensions 60 mm×40 mm x Z mm, where Z is 3.2 mm, 4.0 mm or 5.0 mm.

Painting of the Test Specimens ("UV Paint System"):

The primer used was the product SHP470FT (Momentive Performance Materials Inc. Wilton, CT USA). The protective varnish used was the product AS 4700 (Momentive Performance Materials Inc. Wilton, CT USA).

Coating was effected in a coating chamber with a controlled atmosphere under the respective stipulations of the coating manufacturer, at 23 to 25° C. and at 40% to 48% relative humidity.

The test specimens were cleaned using so-called iso wipes (LymSat® from LymTech Scientific; saturated with 70% isopropanol and 30% deionized water), rinsed off with isopropanol, dried in air for 30 minutes and blown with ionized air.

The test specimens were coated by hand by the flow-coating method. This involved pouring the primer solution over the sheet in the longitudinal direction starting from the upper edge of the small part, while the starting point of the primer on the sheet was simultaneously guided from left to right across the width of the sheet. The primed sheet was ventilated until dust-dry hanging vertically on a clip and cured in an air circulation oven according to the respective manufacturer's stipulations (ventilated at room temperature for 30 minutes and cured at 125° ° C. for 30 minutes). Cooling to room temperature was followed by coating of the primed surface with AS 4700. Ventilation until dust-dry was followed by curing at 130° ° C. in an air circulation oven for 60 min.

The primer layer thickness and the thickness of the topcoat can affect the weathering properties.

The primer layer thickness for the examples that follow was in the range of 1.2-4.0 μm, and the thickness of the topcoat between 4.0 and 8.0 μm.

TABLE 1

Comparative example 1-1. Uncoated test specimen.

| Starting material | % by weight |
|---|---|
| PC1, containing UV absorber, demolding agent | 99.440 |
| Macrolex Yellow G Gran. | 0.005 |
| Bayferrox 110M | 0.100 |
| Macrolex Red EG | 0.300 |
| Colorant 12a/b [specialty] | 0.005 |
| Kronos 2230 | 0.150 |

TABLE 2

Comparative example 1-2. Uncoated test specimen.

| Starting material | % by weight |
|---|---|
| PC2 | 95.00 |
| PC3 | 4.29 |
| Macrolex Yellow G | 0.005 |
| Bayferrox 110M | 0.100 |
| Macrolex Red EG | 0.300 |
| Colorant 12a/b | 0.005 |
| Altiris 550 | 0.300 |

TABLE 3

Comparative example 1-3. Uncoated test specimen.

| Starting material | % by weight |
|---|---|
| PC2 | 95.00 |
| PC3 | 4.29 |
| Macrolex Yellow G | 0.005 |
| Bayferrox 110 M | 0.100 |
| Macrolex Red EG | 0.300 |
| Colorant 12a/b | 0.005 |
| Altiris 800 | 0.300 |

TABLE 4

Comparative example 1-4. Uncoated test specimen.

| Starting material | % by weight |
|---|---|
| PC2 | 95.00 |
| PC3 | 4.29 |
| Macrolex Yellow G | 0.005 |
| Bayferrox 110 M | 0.100 |
| Macrolex Red EG | 0.300 |
| Colorant 12a/b | 0.005 |
| Kronos 2230 titanium dioxide | 0.150 |
| Altiris 550 | 0.150 |

TABLE 5

Uncoated test specimens 1-1 to 1-4 before and after weathering.

| Ex. | Y.I. | Gloss 60° |
|---|---|---|
| 1-1 0h | 103.4 | 103 |
| 1-1 1100 h | 90.6 | 28 |
| 1-2 0 h | 106.1 | 102.3 |

TABLE 5-continued

Uncoated test specimens 1-1 to 1-4 before and after weathering.

| Ex. | Y.I. | Gloss 60° |
|---|---|---|
| 1-2 1100 h | 100.2 | 8 |
| 1-3 0 h | 101.1 | 102 |
| 1-3 1100 h | 97.4 | 11 |
| 1-4 0 h | 109 | 102.4 |
| 1-4 1100 h | 97.5 | 5 |

It is found that, after weathering, all samples, the uncoated test specimens 1-1 to 1-4, have a severe loss of gloss. The differences in the loss of gloss between the samples tend to be small. Of all the samples, example A with titanium dioxide of the Kronos 2230 type still shows the greatest gloss value after weathering. The color is likewise adversely affected, which is documented by the change in Y.I. (measured in reflection). Mixtures of various titanium dioxide types (example 4) show a severe loss of gloss and a color shift. It is barely possible to visually distinguish samples 1-1 to 1-4. In spite of different titanium dioxide types, there are visually no significant differences between the colors of the samples after weathering.

TABLE 6

Comparative example 2-1; substrate layer coated with UV paint system. Red color impression.

| Starting material | % by weight |
|---|---|
| PC4 | 99.435 |
| Kronos 2230 | 0.100 |
| Sicotan Yellow K2107 | 0.030 |
| Heucodur Blue 2R | 0.022 |
| Macrolex Red EG | 0.350 |
| Bayferrox 110 M | 0.0630 |

TABLE 7

Comparative example 2-2; substrate layer coated with UV paint system. Brown color impression.

| Starting material | % by weight |
|---|---|
| PC4 | 99.2055 |
| Oracet Yellow 180 (Oracet Yellow GHS) | 0.0145 |
| Sicotan Yellow K2107 | 0.2200 |
| Colortherm Red 130M | 0.2850 |
| Elftex 570 pearls [specialty] | 0.1400 |
| Kronos 2230 | 0.1350 |

TABLE 8

Comparative example 2-3; substrate layer coated with UV paint system. Green color impression.

| Starting material | % by weight |
|---|---|
| PC4 | 98.9845 |
| Macrolex Yellow 6G [specialty] | 0.0125 |
| Sicotan Yellow K2107 | 0.3500 |
| Heliogen Green K8730 | 0.3470 |
| Lamp Black 101 | 0.1060 |
| Kronos 2230 | 0.2000 |

TABLE 9

Comparative example 2-4; substrate layer coated with UV paint system. Yellow color impression.

| Starting material | % by weight |
|---|---|
| PC4 | 98.875 |
| Macrolex Yellow 6G [specialty] | 0.124 |
| Sicotan Yellow K2107 | 0.021 |
| Kronos 2230 | 0.98 |

TABLE 10

Comparative example 2-5; substrate layer coated with UV paint system. Blue color impression.

| Starting material | % by weight |
|---|---|
| PC4 | 99.26182 |
| Sicotan Yellow K1010 | 0.10000 |
| Ultramarine Blue Nubix F-70 | 0.23800 |
| Heliogen Blue K7104 LW | 0.16800 |
| Heliogen Green K8730 | 0.00148 |
| Lamp Black 101 | 0.00070 |
| Kronos 2230 | 0.13000 |
| Triphenylphosphine (TPP) | 0.10000 |

TABLE 11

Test specimens 2-1 to 2-5 before and after XeWom 0.75 W weathering

| | $L^*$ 0 h | $a^*$ 0 h | $b^*$ 0 h | $L^*$ 3000 h | $a^*$ 3000 h | $b^*$ 3000 h | $\Delta L^*$ | $\Delta a^*$ | $\Delta b^*$ |
|---|---|---|---|---|---|---|---|---|---|
| C. 2-1 | 34.21 | 36.85 | 17.33 | 35.97 | 34.59 | 14.62 | 1.76 | 2.26 | 2.71 |
| C. 2-2 | 26.40 | 2.02 | 1.67 | 26.94 | 1.50 | 0.95 | 0.54 | 0.52 | 0.72 |
| C. 2-3 | 30.54 | −12.44 | 2.45 | 31.44 | −12.17 | 1.01 | 0.90 | 0.27 | 1.44 |
| C. 2-4 | 90.02 | −9.35 | 81.89 | 90.86 | −8.55 | 65.88 | 0.84 | 0.80 | 16.09 |
| C. 2-5 | 34.73 | −5.48 | −29.34 | 36.07 | −6.74 | −28.74 | 1.34 | 1.26 | 0.6 |

C.: here and hereinafter = comparative example

Visual Impression:
- C. 2-1: loss of gloss
- C. 2-2: loss of gloss
- C. 2-3: loss of gloss
- C. 2-4: loss of gloss
- C. 2-5: loss of gloss; streaks Surprisingly, color formulations for red, green, blue, yellow and brown hues all show unstable weathering characteristics, even though a titanium dioxide pigment optimized for polycarbonate, Kronos 2230, was used. Moreover, a UV scratch-resistant coating had also been applied to the specimens. For all specimen plaques, however, after weathering, a loss of gloss or brilliance was visually apparent. This loss of brilliance is in spite of coating with a UV-containing paint system. Example 2-2 shows a smaller variance in color with regard to the Lab values. This is probably attributable to a small content of organic colorant. It can be assumed that inorganic colorants will have much higher color stability.

TABLE 12

Comparative examples 3-1 to 3-5. Substrate layer coated with UV paint system.

| Starting materials | C. 3-1 Yellow % by weight | C. 3-2 Red % by weight | C. 3-3 Green % by weight | C. 3-4 Blue % by weight | C. 3-5 Brown % by weight |
|---|---|---|---|---|---|
| Makrolon ® AG2677 | 98.3405 | 99.44 | 93.905 | 99.4035 | 99.288 |
| Kronos 2230 | 1.47 | 0.15 | 0.200 | 0.29 | 0.22 |
| Bayferrox 110M | | 0.100 | | | 0.29 |
| Red EG | | 0.300 | | | |
| Macrolex Yellow 6G | 0.181 | | | | |
| Oracet Yellow 180 | 0.0085 | | | | |
| Macrolex Yellow G | | | 0.005 | 0.005 | 0.001 | 0.005 |
| Colorant 12a/b | | | 0.005 | | 0.0055 | |
| Sicotan Yellow K2107 | | | | 0.43 | |
| Heliogen Green K8730 | | | | 0.35 | |
| Lamp Black 101 | | | | 0.11 | |
| Heliogen Blue K7104 | | | | | 0.25 | |
| TPP | | | | | 0.05 | |
| Sicotan Yellow K2011 | | | | | | 0.077 |
| Black Pearls 800 | | | | | | 0.12 |

TABLE 13

Comparative examples 3-1 to 3-5 before and after weathering.

| | L* | a* | b* | Gloss 60° | L* | a* | b* | Gloss 60° |
|---|---|---|---|---|---|---|---|---|
| | | | 0 h | | | | 2600 h | |
| C. 3-1 Yellow | 90.5 | −9.6 | 82.1 | 81.5 | 91.9 | −8.9 | 65.6 | 79.8 |
| C. 3-2 Red | 34.9 | 36.1 | 17 | 79 | 36.7 | 34.1 | 13.4 | 76.2 |
| C. 3-3 Green | 31.2 | −12.7 | 2.5 | 78 | 32.5 | −12 | 1.43 | 76.3 |
| C. 3-4 Brown | 26.5 | 1.9 | 1.7 | 78 | 27.2 | 1.46 | 1.1 | 76.8 |

Visual Impression:
- C. 3-1 Yellow: distinct loss of gloss
- C. 3-2 Red: distinct loss of gloss
- C. 3-3 Green: distinct loss of gloss
- C. 3-4 Brown: moderate loss of gloss Further compositions for a green, red, yellow and brown color setup are detailed in comparative examples 3-1 to 3-4. As in comparative examples 2-1 to 2-5, the compositions are unstable to weathering.

TABLE 14

Comparative examples 4-1 to 4-5. Test specimens with UV absorber and triisooctyl phosphate in the substrate layer. Substrate layer coated with UV paint system.

| Starting material | C. 4-1 Yellow % by weight | C. 4-2 Red % by weight | C. 4-3 Green % by weight | C. 4-4 Blue % by weight | C. 4-5 Brown % by weight |
|---|---|---|---|---|---|
| Makrolon ® AG2677 | 98.1305 | 99.23 | 98.795 | 99.1935 | 99.078 |
| Kronos 2230 | 1.47 | 0.15 | 0.200 | 0.29 | 0.22 |
| Bayferrox 110M | | 0.100 | | | 0.29 |
| Red EG | | 0.300 | | | |
| Macrolex Yellow 6G | 0.181 | | | | |
| Oracet Yellow 180 | 0.0085 | | | | |
| Macrolex Yellow G | | | 0.005 | 0.005 | 0.001 | 0.005 |
| Colorant 12a/b | | | 0.005 | | 0.0055 | |
| Sicotan Yellow K2107 | | | | 0.43 | |
| Heliogen Green K8730 | | | | 0.35 | |
| Lamp Black 101 | | | | 0.11 | |
| Heliogen Blue K7104 | | | | | 0.25 | |
| TPP | | | | | 0.05 | |
| Sicotan Yellow K2011 | | | | | | 0.077 |
| Black Pearls 800 | | | | | | 0.12 |
| TOF | 0.01 | 0.01 | 0.01 | 0.01 | 0.01 |
| Tinuvin 329 | 0.2 | 0.2 | 0.2 | 0.2 | 0.2 |

TABLE 15

Comparative examples 4-1 to 4-5 before and after weathering.

| | L* | a* | b* | Gloss 60° | L* | a* | b* | Gloss 60° |
|---|---|---|---|---|---|---|---|---|
| | | | 0 h | | | | 2600 h | |
| C. 4-1 Yellow | 90.5 | −9.6 | 82.7 | 80 | 91.9 | −9.0 | 65.1 | 79.1 |
| C. 4-2 Red | 34.9 | 36.1 | 17.2 | 78 | 36.7 | 34.3 | 13.5 | 76.8 |
| C. 4-3 Green | 31.3 | −13.7 | 2.5 | 77.8 | 32.0 | −13 | 1.7 | 76.7 |
| C. 4-4 Blue | 34.8 | −6.5 | −29 | 77.9 | 35.2 | −5.4 | −30 | 77 |
| C. 4-5 Brown | 26.5 | 1.71 | 1.7 | 77.9 | 27.2 | 1.26 | 0.77 | 76.6 |

Visual Impression:
- C. 4-1: distinct loss of gloss
- C. 4-2: distinct loss of gloss (color looks very dull)
- C. 4-3: distinct loss of gloss (color looks very dull)
- C. 4-4: no loss of gloss (color looks colorful)
- C. 4-5: moderate loss of gloss (color looks dull)

It is known that titanium dioxide-containing pigments interact with UV radiation and hence have high photoactivity. However, a relatively high UV absorber content in the substrate layer has, surprisingly, no influence on weathering stability in the case of Kronos 2230 titanium dioxide pigment optimized for polycarbonate.

TABLE 16

Comparative examples 5-1 to 5-4. Substrate layer coated with UV paint system.

| Starting material | C. 5-1 Red % by weight | C. 5-2 Yellow % by weight | C. 5-3 Blue % by weight | C. 5-4 Red w/o $TiO_2$ % by weight |
|---|---|---|---|---|
| PC1 | 95.00 | 95.00 | 95.00 | 95.00 |
| PC3 | 4.437 | 3.86 | 4.6693 | 4.398 |
| Kronos 2230 | 0.1 | 1.0 | 0.13 | |
| Bayferrox 110M | 0.063 | | | 0.2 |
| Red EG | 0.4 | | | 0.35 |
| Yellow 3G | | 0.14 | | |
| Lamp Black 101 | | | 0.0007 | |
| Paliogen Blue 6385 | | | 0.2 | |
| Heucodur Blue 2R | | | | 0.022 |
| Sicotan Yellow K2107 | | | | 0.03 |

TABLE 17

Comparative examples 5-1 to 5-4 before and after weathering.

| | L* | a* | b* | Gloss 60° | L | a* | b* | Gloss 60° |
|---|---|---|---|---|---|---|---|---|
| | | | 0 h | | | | 2600 h | |
| C. 5-1 Red | 33.5 | 37.2 | 16.9 | 77.7 | 34.6 | 36.3 | 14.8 | 76.8 |
| C. 5-2 Yellow | 87.1 | −6.2 | 68.4 | 81 | 87.9 | −5.1 | 60.8 | 79.2 |
| C. 5-3 Blue | 29.3 | 5.79 | −20.5 | 78 | 29.6 | 4.37 | −18.4 | 77 |
| C. 5-4 Red w/o $TiO_2$ | 30.9 | 29.5 | 14.8 | 80 | 31.4 | 29.1 | 14.4 | 76.3 |

Visual Impression:

C. 5-1: distinct loss of gloss

C. 5-2: distinct loss of gloss

C. 5-3: little loss of gloss

C. 5-4: no loss of gloss: dull color: not brilliant (relative to the 0 h value)

It is found that color formulations containing no titanium dioxide are very stable. No significant loss of gloss occurs after weathering. However, such hues have a dull color impression of low brilliance.

TABLE 18

Comparative examples 6-1 to 6-4. Higher colorant concentrations in the substrate layer. Substrate layer coated with UV paint system.

| Starting material | C. 6-1 % by weight | C. 6-2 % by weight | C. 6-3 % by weight | C. 6-4 % by weight |
|---|---|---|---|---|
| PC1 | 95.0 | 95.0 | 95.0 | 95.0 |
| PC3 | 3.87 | 3.15 | 3.50 | 4.0 |
| Kronos 2230 | 0.2 | 0.4 | | 0.5 |
| Bayferrox 110M | 0.126 | 0.25 | | |
| Macrolex Red EG | 0.7 | 1.0 | | |
| Heucodur Blue 2R | 0.044 | 0.1 | | |
| Sicotan Yellow K2107 | 0.06 | 0.1 | | |
| Sicotan Yellow K1010 | | | 1.0 | |
| Yellow 3G | | | 0.5 | 0.5 |

TABLE 19

Comparative examples 6-1 to 6-4 before and after weathering.

| | L* | a* | b* | Gloss 60° | L* | a* | b* | Gloss 60° |
|---|---|---|---|---|---|---|---|---|
| | | | 0 h | | | | 2600 h | |
| C. 6-1 | 33.6 | 35.6 | 15.8 | 78 | 35.8 | 32.8 | 12.9 | 77.2 |
| C. 6-2 | 34.2 | 35.4 | 15.8 | 78 | 38.8 | 29.4 | 11.6 | 77.1 |
| C. 6-3 | 78.3 | 6.0 | 84.5 | 79 | 79.5 | 6.6 | 82.7 | 78.3 |
| C. 6-4 | 73.8 | 16.1 | 74.9 | 79.3 | 74.4 | 16.4 | 70.3 | 78.2 |

Visual Color Impression:

C. 6-1: loss of gloss

C. 6-2: loss of gloss

C. 6-3: no loss of gloss

C. 6-4: no loss of gloss

It is found that compositions containing no titanium dioxide (C. 6-3) are very stable to weathering. However, such hues have a dull color impression of low brilliance. Since titanium dioxide breaks down organic colorants as a result of the photoactivity discussed, the person skilled in the art would have expected an increase in the color concentration of organic colorants in the compositions to contribute to elevated stability. However, this is surprisingly not the case (C. 6-1, C. 6-2).

| Starting material | Ex. 7-1 Inv. % by weight | Ex. 7-2 Inv. % by weight | Ex. 7-3 Inv. % by weight | Ex. 7-4 Inv. % by weight |
|---|---|---|---|---|
| PC2 | 95.000 | 95.000 | 95.000 | 95.000 |
| PC3 | 4.290 | 4.290 | 3.740 | 3.740 |
| Macrolex Yellow G | 0.005 | 0.005 | 0.005 | 0.005 |
| Bayferrox 110 M | 0.100 | 0.100 | 0.100 | 0.100 |
| Macrolex Red EG | 0.300 | 0.300 | 0.300 | 0.300 |
| Colorant 12a/b | 0.005 | 0.005 | 0.005 | 0.005 |
| Altiris 550 | 0.300 | | 0.300 | |
| Altiris 800 | | 0.300 | | 0.300 |
| Tinuvin 326 | | | 0.500 | 0.500 |
| Richnox B900 | | | 0.050 | 0.050 |

TABLE 21

Examples 7-1 to 7-4 before and after weathering.

|  | L* 0 h | a* 0 h | b* 0 h | L* 2750 h | a* 2750 h | b* 2750 h | Δ L* | Δ a* | Δ b* |
|---|---|---|---|---|---|---|---|---|---|
| Ex. 7-1 Inv. | 36.06 | 35.68 | 18.94 | 36.87 | 35.15 | 17.49 | 0.81 | 0.53 | 1.45 |
| Ex. 7-2 Inv. | 34.38 | 33.78 | 17.66 | 35.08 | 33.59 | 16.41 | 0.70 | 0.19 | 1.25 |
| Ex. 7-3 Inv. | 35.29 | 35.39 | 18.11 | 36.00 | 35.05 | 16.85 | 0.71 | 0.34 | 1.26 |
| Ex. 7-4 Inv. | 33.88 | 33.70 | 16.88 | 34.41 | 33.65 | 16.11 | 0.53 | 0.05 | 0.77 |

In all inventive examples, the compositions have light transmittance of <0.5% in the range from 380 to 780 nm, determined at a sheet thickness of 4 mm to DIN ISO 13468-2:2006 (D65, 10°).

Visual Impression:
  Inv. ex. 7-1: no loss of gloss
  Inv. ex. 7-2: no loss of gloss
  Comp. ex. 6-3: distinct loss of gloss
  Comp. ex. 6-4: distinct loss of gloss
  Inv. ex. 7-3: no loss of gloss
  Inv. ex. 7-4: no loss of gloss Since red formulations showed the greatest loss of gloss after weathering, red formulations were selected as the basis for these further experiments. Compositions 7-1 to 7-4 together with a UV paint system as coating completely surprisingly result in a weathering-stable multilayer article. The combination of titanium dioxide for use in accordance with the invention having a specific minimum particle size and coating composition comprising Kronos 2230, by contrast, does not lead to weathering-stable multilayer articles. This could not be assumed from the small or zero differences in the case of uncoated test specimens. The titanium dioxide for use in accordance with the invention with the greatest particle size (D50) gives the most stable compositions for the multilayer articles of the invention.

It is also apparent (C. 7-3, C. 7-4) that UV absorbers in combination with the titanium dioxide grades to be used in accordance with the invention display a positive effect. This was likewise not to be expected in the light of the comparative examples with elevated UV absorber content.

TABLE 22

Melt stability of compositions with different titanium dioxide grades. Compositions 8-1 to 8-3.

| Starting material | Ex. 8-1 % by weight | Ex. 8-2 % by weight | Ex. 8-3 % by weight |
|---|---|---|---|
| PC2 | 95.0 | 95.0 | 95.0 |
| PC3 | 4.5 | 4.5 | 4.5 |
| Altiris 550 | 0.5 | | |
| Altiris 800 | | 0.5 | |
| Kronos 2230 | | | 0.5 |

TABLE 23

Melt stability of compositions 8-1 to 8-3.

|  | Ex. 8-1 | Ex. 8-2 | Ex. 8-3 |
|---|---|---|---|
| MVR 300° C.; 5 min | 7.4 | 6.8 | 6.9 |
| MVR 300° C.; 20 min | 7.7 | 7.5 | 7.5 |
| MVR 300° C.; 30 min | 8.0 | 7.9 | 7.8 |

It has been shown that, surprisingly, compositions containing a non-polycarbonate-optimized titanium dioxide pigment (ex. 8-1 and 8-2) do not show significantly lower melt stability than compositions containing a polycarbonate-optimized titanium dioxide grade (Kronos 2230, ex. 8-3).

The invention claimed is:

1. A multilayer article comprising
   a) a substrate layer having light transmittance in the range from 380 to 780 nm of less than 0.5%, determined at a sheet thickness of 4 mm to DIN ISO 13468-2:2006 (D65, 10°),
      consisting of a thermoplastic composition based on polymethylmethacrylate or aromatic polycarbonate, comprising
      i) titanium dioxide white pigment,
         wherein the titanium dioxide present in the composition of the substrate layer has a rutile content of at least 60% by weight and
         wherein the titanium dioxide has a coating containing silicon dioxide and aluminum oxide and titanium dioxide, and wherein the ratio of the sum total of the aluminum content and silicon content in atom %, determined by means of x-ray photon electron spectroscopy, in the coating to the titanium content in atom %, determined by means of x-ray photon electron spectroscopy, in the coating is greater than 5:1,
      ii) at least two colorants that are either one organic colorant and one inorganic colorant or two organic colorants, wherein the inorganic colorant is not a titanium dioxide and not a carbon black,
   b) optionally a primer layer and
   c) a topcoat layer,
      wherein the primer layer and/or the topcoat layer includes at least one UV absorber, characterized in that
      the titanium dioxide present in the composition of the substrate layer has a median particle size $D_{50}$, determined by means of scanning electron microscopy, of ≥0.3 μm.

2. The multilayer article as claimed in claim 1, wherein the topcoat layer comprises at least one UV absorber from the group of the benzophenones, resorcinols, 2-(2-hydroxyphenyl)benzotriazoles, hydroxyphenyl-s-triazines, 2-cyanoacrylates and/or oxalanilides.

3. The multilayer article as claimed in claim 1, wherein the total concentration of colorants in the thermoplastic composition of the substrate layer, excluding titanium dioxide, is 0.012% to 1.2% by weight.

4. The multilayer article as claimed in claim 1, wherein the titanium dioxide has a median particle size D50, determined by means of scanning electron microscopy, of 0.6 μm to 1.2 μm.

5. The multilayer article as claimed in claim 1, wherein the ratio of the sum total of the aluminum content and silicon content in atom % in the titanium dioxide coating to the titanium content in atom % in the titanium dioxide coating is at least 15:1.

6. The multilayer article as claimed in claim 1, wherein the titanium dioxide has a median particle size D50, determined by means of scanning electron microscopy, of 0.65 μm to 1.15 μm and the ratio of the sum total of the aluminum content and silicon content in atom % in the titanium dioxide coating to the titanium content in atom % in the titanium dioxide coating is at least 19:1.

7. The multilayer article as claimed in claim 1, wherein the thermoplastic composition of the substrate layer contains 0.1% to 0.6% by weight of at least one UV absorber.

8. The multilayer article as claimed in claim 1, wherein the thermoplastic composition of the substrate layer contains 2-(5-chloro-2H-benzotriazol-2-yl)-6-(1,1-dimethylethyl)-4-methylphenol as UV absorber.

9. The multilayer article as claimed in claim 1, wherein the amount of titanium dioxide in the thermoplastic composition of the substrate layer is 0.1% to 1.5% by weight.

10. The multilayer article as claimed in claim 1, wherein the at least one organic colorant is selected from the group consisting of:

-continued

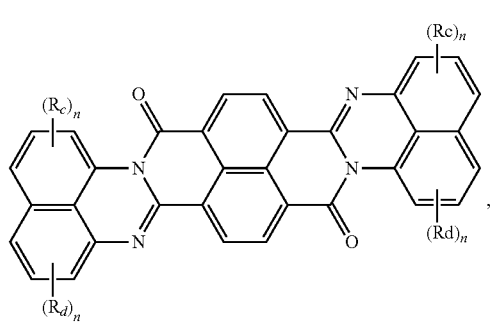 (4b)

where
- Rc and $R^d$ are independently a linear or branched alkyl radical or halogen,
- n independently of the respective R is a natural number from 0 to 3, where the radical is hydrogen when n=0,

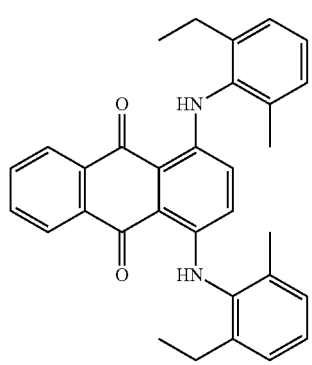 (5)

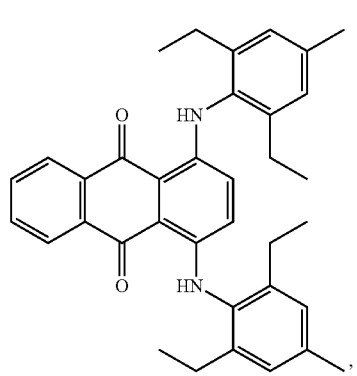 (6)

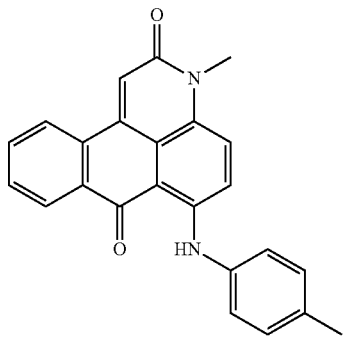 (7)

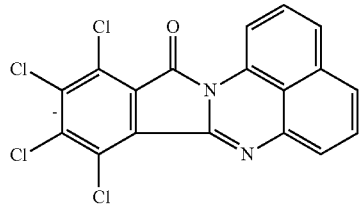 (8)

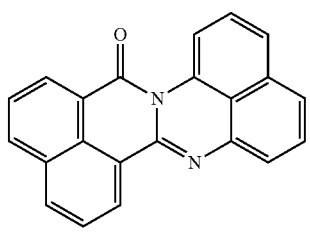 (9)

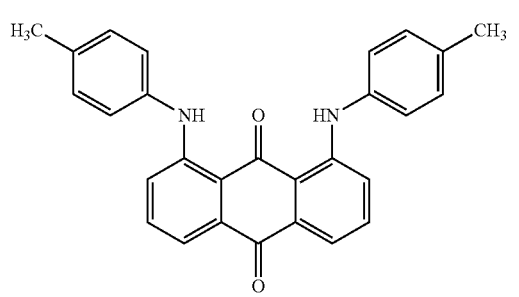 (10)

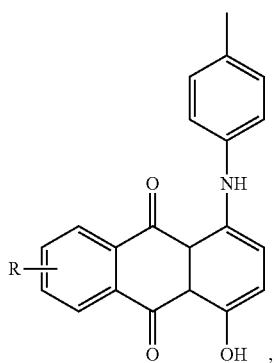 (11)

where R is selected from the group consisting of H and p-methylphenylamine radical, and
- at least one red and/or violet colorant selected from the group consisting of the colorants of formulae (7), (8), (9), (10), (11), (12a), (12b) and/or (13)

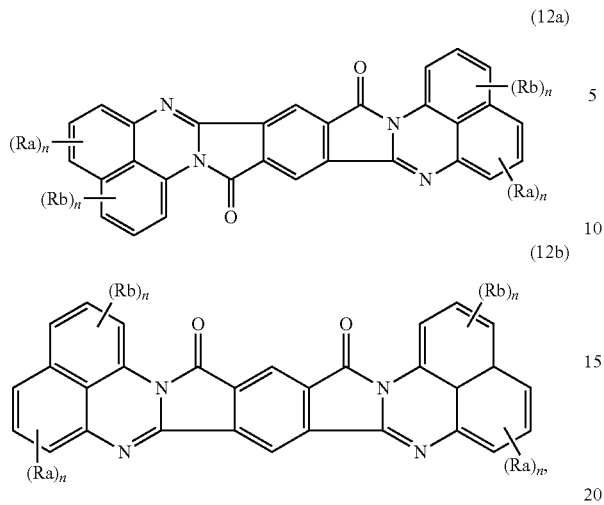

(12a)

(12b)

where
Ra and Rb are independently a linear or branched alkyl radical or halogen,
n independently of the respective R is a natural number from 0 to 3, where the radical is hydrogen when n=0,

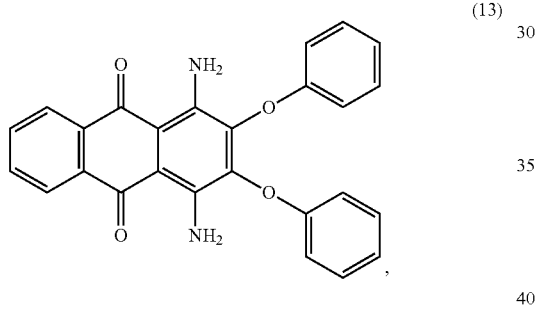

(13)

optionally one or more further colorants selected from the group consisting of the yellow and orange colorants of the formulae (14), (15), (16), (17) and/or (18)

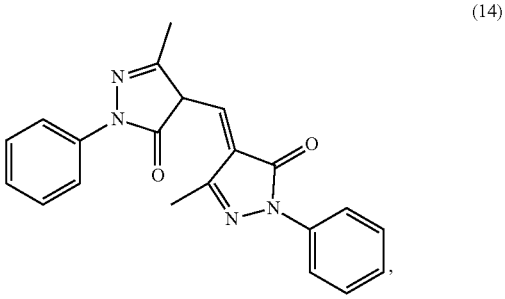

(14)

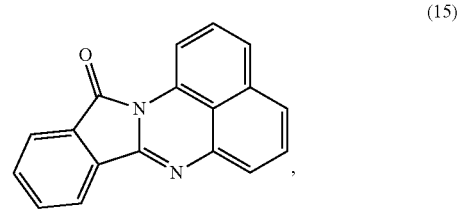

(15)

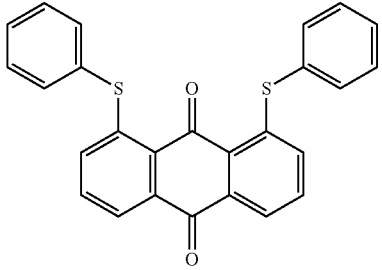

(16)

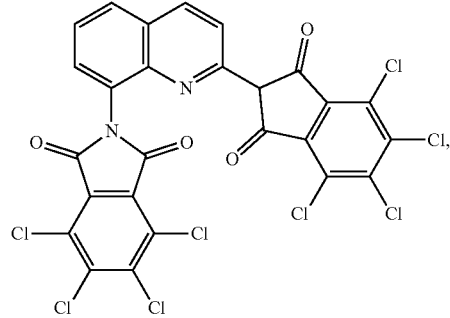

(17)

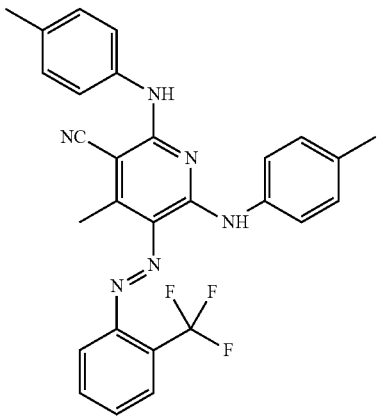

(18)

the colorant Amaplast Yellow GHS with CAS number 13676-91-01, and those from the Heliogen Blue series and the Heliogen Green series.

11. The multilayer article as claimed in claim 1, wherein the topcoat layer is polysiloxane-based and comprises a combination of an organomodified silane with a silica sol, and wherein the topcoat layer comprises silicon dioxide particles.

12. The multilayer article as claimed in claim 1, wherein the thickness of the substrate layer is 1.0 to 6.0 mm.

13. The multilayer article as claimed in claim 1, wherein the multilayer article is a pipe element, part of a window frame, part of a housing of an electrical switchgear box, part of an antenna, a lamp cover, a watering can, a housing part of a tool or toolbox, part of a toy or play equipment, an antenna or antenna element, or a housing or part of a housing of a mobile communications base station.

14. The multilayer article as claimed in claim 1, wherein the multilayer article is an element of an outer vehicle skin.

15. A method comprising utilizing white pigment titanium dioxide having a rutile content of at least 60% by weight and a median particle size D50, determined by means of scanning electron microscopy, of ≥0.3 μm, and having a coating comprising silicon dioxide, aluminum oxide and titanium dioxide, wherein the ratio of the sum total of the aluminum content and silicon content in atom % in the coating to the titanium content in atom % in the coating, determined by means of x-ray photon electron spectroscopy, is greater than 5:1, in a substrate layer in combination with a coating comprising
- a topcoat layer and optionally a primer layer, wherein the topcoat layer and/or the primer layer includes at least one UV absorber,
- and achieving weathering stability, expressed by a change in the color values a*, b*, L* after artificial weathering for 2500 h with xenon illumination at 0.75 W at 340 nm to ASTM G 155-13 of $\Delta L^*<1.5$, $\Delta a^*<1.5$ and $\Delta b^*<1.5$, of colored multilayer articles comprising a) the substrate layer having light transmittance in the range from 380 to 780 nm of less than 0.5%, determined at a sheet thickness of 4 mm to DIN ISO 13468-2:2006 (D65, 10°), consisting of a thermoplastic composition based on polymethylmethacrylate or aromatic polycarbonate and comprising
  - at least two colorants that are either one organic colorant and one inorganic colorant or two organic colorants, wherein the inorganic colorant is not a titanium dioxide and not a carbon black,
- b) the coating comprising the topcoat layer and optionally the primer layer.

* * * * *